(12) United States Patent
Sato et al.

(10) Patent No.: US 10,791,594 B2
(45) Date of Patent: Sep. 29, 2020

(54) LIGHT BEAM DIRECTION CONTROL DEVICE

(71) Applicant: TIANMA JAPAN, LTD., Kawasaki, Kanagawa (JP)

(72) Inventors: Tetsushi Sato, Kanagawa (JP); Kazunori Masumura, Kanagawa (JP); Kunihiro Shiota, Kanagawa (JP); Kenichi Takatori, Kanagawa (JP)

(73) Assignee: TIANMA JAPAN, LTD., Kawasaki, Kanagawa (JP)

( * ) Notice: Subject to any disclaimer, the term of this patent is extended or adjusted under 35 U.S.C. 154(b) by 0 days.

(21) Appl. No.: 16/697,511

(22) Filed: Nov. 27, 2019

(65) Prior Publication Data

US 2020/0170087 A1 May 28, 2020

(30) Foreign Application Priority Data

Nov. 28, 2018 (JP) ................................ 2018-222198

(51) Int. Cl.
*H05B 39/04* (2006.01)
*G02B 5/30* (2006.01)
*H05B 47/105* (2020.01)

(52) U.S. Cl.
CPC ......... *H05B 39/042* (2013.01); *G02B 5/3058* (2013.01); *H05B 47/105* (2020.01)

(58) Field of Classification Search
CPC ... H05B 39/042; H05B 47/105; G02B 5/3058
USPC .......................................................... 362/97
See application file for complete search history.

(56) References Cited

U.S. PATENT DOCUMENTS 7,751,667 B2 * 7/2010 Daniel ..................... G02B 6/08
385/116

* cited by examiner

*Primary Examiner* — Ali Alavi
(74) *Attorney, Agent, or Firm* — Sughrue Mion, PLLC

(57) ABSTRACT

A control circuit is configured to: change a dispersion state of the electrophoretic particles by controlling voltage across the first transparent electrode and the second transparent electrode to change a range of exit direction of light transmitted through the light transmissive regions and the dispersion medium; apply direct voltage at a first voltage value across the first transparent electrode and the second transparent electrode to change the range of exit direction from a narrow range to a wide range; measure luminance of light transmitted through the light beam direction control panel during application of the voltage at the first voltage value; and increase the voltage value to be applied across the first transparent electrode and the second transparent electrode in a case where the measured luminance of the transmitted light is lower than a target value.

18 Claims, 23 Drawing Sheets

| LUMINANCE RATE OF TRANSMITTED LIGHT (MEASURED LUMINANCE/TARGET LUMINANCE)% | INCREMENT TO APPLIED VOLTAGE |
|---|---|
| $0 \leqq x \leqq 20$ | 5 |
| $20 < x \leqq 40$ | 4 |
| $40 < x \leqq 60$ | 3 |
| $60 < x \leqq 80$ | 2 |
| $80 < x$ | 0 |

*FIG. 11B* ional application claims priority under 35
LIGHT BEAM DIRECTION CONTROL DEVICE

CROSS-REFERENCE TO RELATED APPLICATIONS

This Non-provisional application claims priority under 35 U.S.C. §119(a) on Patent Application No. 2018-222198 filed in Japan on Nov. 28, 2018, the entire content of which is hereby incorporated by reference.

BACKGROUND

This disclosure relates to a light beam direction control device.

Flat-panel display devices are used as display devices in various information processing devices such as mobile phones, personal digital assistants (PDAs), automatic teller machines (ATMs), and personal computers.

A commonly known configuration for such flat-panel display devices includes a built-in optical element for adjusting the exit direction of the light that has entered from the backside, a backlight for emitting light uniformly toward the optical element, and a liquid crystal display for displaying an image.

The trend of increase in size and usage of display screens is producing demands for various light distribution characteristics to the flat-panel display devices. Particularly from the viewpoint of information leakage, there is a demand to limit the viewable range to prevent peeking or a demand not to provide light in unnecessary directions. As an optical element meeting this demand, an optical film capable of limiting the viewable range of the display (or the range of outgoing light) has been proposed and commercialized.

A flat-panel display device with this optical film requires removing the optical film each time when people want to see the display from multiple directions together. Because of such bothersome operations and waste of time for the user, there is an increasing demand to achieve a wide viewable range state and a narrow viewable range state at desired times without a bothersome operation of removing the film.

To meet this demand, an optical element capable of switching the viewable range of the display between a wide view mode and a narrow view mode has been proposed (for example, U.S. Pat. No. 7,751,667 B). U.S. Pat. No. 7,751, 667 B discloses a light beam direction control element which includes light transmissive regions and electrophoretic elements for controlling the direction of light provided on a transparent substrate and controls the viewing angle of the light transmitted through the light transmissive regions. According to U.S. Pat. No. 7,751,667 B, transparent electrodes are provided on both ends of each electrophoretic element in which liquid including colored (black) charged particles is encapsulated. To achieve a wide viewing angle state, a direct voltage is applied across the transparent electrodes to move the colored charged particles. To achieve a narrow viewing angle state, an alternating voltage is applied across the transparent electrodes to disperse the colored charged particles within the electrophoretic elements.

SUMMARY

An aspect of this disclosure is a light beam direction control device comprising: a light beam direction control panel; and a control circuit configured to control the light beam direction control panel, wherein the light beam direction control panel includes: a first transparent substrate having a first main face; a second transparent substrate having a second main face opposed to the first main face, a plurality of light transmissive regions provided between the first main face and the second main face, the plurality of light transmissive regions being arrayed along the first main face; a plurality of light absorbing regions provided between the first main face and the second main face, each of the plurality of light absorbing regions including light-absorptive electrophoretic particles having charges of a specific polarity and light-transmissive dispersion medium and being disposed between light transmissive regions adjacent to each other; and a first transparent electrode and a second transparent electrode provided on the first main face of the first transparent substrate and the second main face of the second transparent substrate, respectively, in such a manner that the first transparent electrode and the second transparent electrode sandwich the plurality of light absorbing regions, and wherein the control circuit is configured to: change a dispersion state of the electrophoretic particles by controlling voltage across the first transparent electrode and the second transparent electrode to change a range of exit direction of light transmitted through the light transmissive regions and the dispersion medium; apply direct voltage at a first voltage value across the first transparent electrode and the second transparent electrode to change the range of exit direction from a narrow range to a wide range; measure luminance of light transmitted through the light beam direction control panel during application of the voltage at the first voltage value; and increase the voltage value to be applied across the first transparent electrode and the second transparent electrode in a case where the measured luminance of the transmitted light is lower than a target value.

It is to be understood that both the foregoing general description and the following detailed description are exemplary and explanatory and are not restrictive of this disclosure.

BRIEF DESCRIPTION OF THE DRAWINGS

FIG. 11B provides an example of a look-up table to be used for the feedback control of the voltage to be applied;

EMBODIMENTS

Hereinafter, embodiments of this disclosure are described with reference to the accompanying drawings. It should be noted that the embodiments are merely examples to implement this disclosure and not to limit the technical scope of this disclosure. Elements common to drawings are assigned the same reference signs.

The light beam direction control device in this disclosure measures the light transmitted through its light beam direction control panel after starting application of voltage to the light beam direction control panel to change the light beam direction control panel from a narrow viewing angle state to a wide viewing angle state. The narrow viewing angle state is a state where the directions of outgoing light are in a narrow range and the wide viewing angle state is a state where the directions of outgoing light is in a wide range. The light beam direction control device controls the voltage to be applied to the light beam direction control panel based on the measurement result. As a result, the light beam direction control panel can speedily change from a narrow viewing angle state to a wide viewing angle state.

Embodiment 1

Device Configuration

Figure 1:
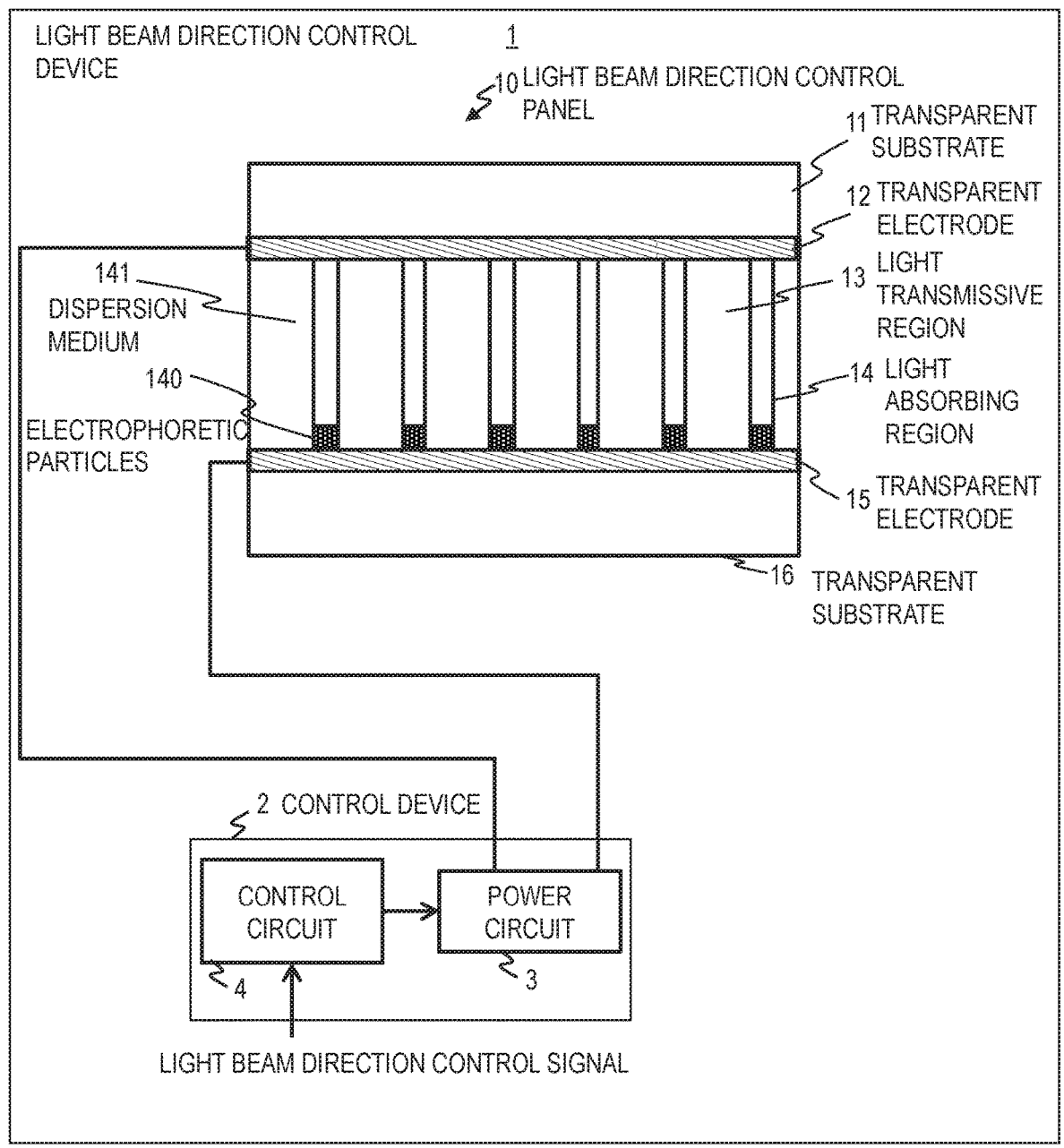
FIG. 1 is a block diagram illustrating an example of a light beam direction control device.

FIG. 1 is a block diagram illustrating an example of a light beam direction control device. A light beam direction control device 1 includes a light beam direction control panel 10 for controlling the viewing angle and a control device 2. The light beam direction control panel 10 includes a transparent electrode 12 and another transparent electrode 15 each made of a sheet of transparent conductive film.

The control device 2 includes a power circuit 3 and a control circuit 4. The control circuit 4 receives a light beam direction control signal from a host control device (not shown). The control circuit 4 controls the potentials to be applied from the power circuit 3 to the transparent electrode 12 and the transparent electrode 15 (the voltage across the transparent electrode 12 and the transparent electrode 15), based on the light beam direction control signal.

FIG. 1 also illustrates an example of the cross-sectional structure of the light beam direction control panel 10. The transparent electrode 12 (second transparent electrode) is on the main face of a transparent substrate 11 (second transparent substrate) and the transparent electrode 15 (first transparent electrode) is on the main face of a transparent substrate 16 (first transparent substrate). The transparent substrate 11 and the transparent substrate 16 are disposed in such a manner that their main faces are opposed to each other. Between the transparent electrode 12 and the transparent electrode 15 opposed to each other, light transmissive regions 13 and light absorbing regions 14 are disposed. The light transmissive regions 13 and the light absorbing regions 14 are disposed alternately along the main faces of the transparent substrates 11 and 16.

The transparent substrates 11 and 16 can be made of glass, polyethylene terephthalate (PET), polycarbonate (PC), or polyethylene naphthalate (PEN), for example. The transparent electrodes 12 and 15 can be made of ITO, ZnO, or IGZO, for example.

Figure 2:
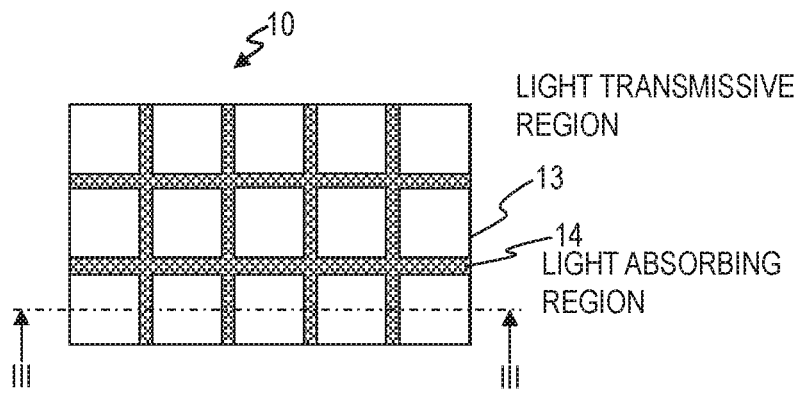
FIG. 2 is a plan diagram illustrating an example of the layout of light transmissive regions and light absorbing regions when viewed in the direction normal to the main face of the light beam direction control panel.

FIG. 2 is a plan diagram illustrating an example of the layout of the light transmissive regions 13 and the light absorbing regions 14 when viewed in the direction normal to the main face of the light beam direction control panel 10 (the transparent substrates 11 and 16), or when viewed planarly. Rectangular light transmissive regions 13 are disposed at predetermined intervals in the vertical direction and the horizontal direction of the drawing.

Light absorbing regions 14 are provided between light transmissive regions 13 adjacent to each other. Note that the layout of the light transmissive regions 13 and the light absorbing regions 14 is not limited to the example of FIG. 2.

A light transmissive region 13 is made of a transparent material (for example, resin) that transmits light. The height thereof can be within the range from 3 µm to 300 µm. The width of a light transmissive region 13 (light transmissive pattern width) can be within the range from 1 µm to 150 µm. Furthermore, the width between light transmissive regions 13 (light blocking pattern width) can be within the range from 0.25 µm to 40 µm.

As illustrated in FIG. 1, an electrophoretic element is encapsulated in each light absorbing region 14. The electrophoretic element is a mixture of light-blocking electrophoretic particles 140 having charges of a specific polarity and dispersion medium 141. To achieve a light blocking function, the electrophoretic particles 140 can be black in color that absorbs light.

The electrophoretic particles 140 can be charged microparticles of carbon black. The example described in the following employs negatively charged carbon black microparticles. The dispersion medium 141 is transparent to transmit light and has a refractive index substantially equal to the refractive index of the transparent material of the light transmissive regions 13. This configuration minimizes the interfacial reflection between the dispersion medium 141 and the light transmissive regions 13.

Figure 3:
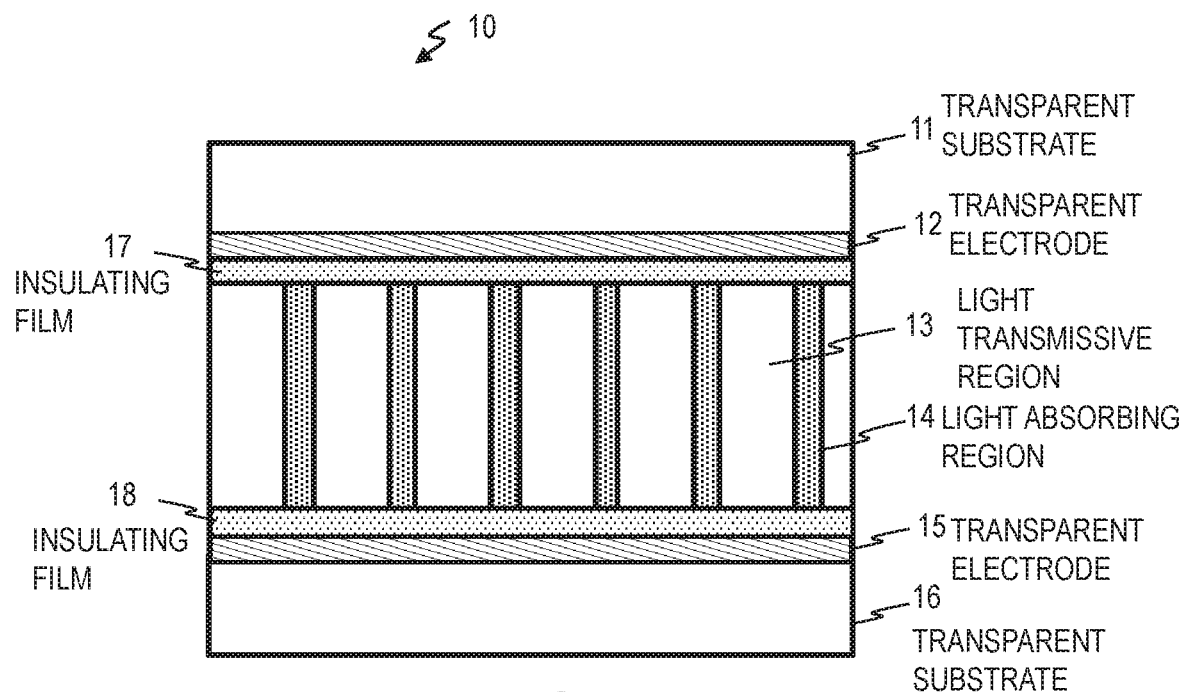
FIG. 3 is a cross-sectional diagram of a light beam direction control panel cut along the line III-III in FIG. 2 to illustrate another configuration example.

FIG. 3 is a cross-sectional diagram of a light beam direction control panel 10 cut along the line III-III in FIG. 2 to illustrate another configuration example. The light beam direction control panel 10 includes insulating films 17 and 18 covering the transparent electrodes 12 and 15 in addition to the configuration illustrated in FIG. 1. The other elements are the same as those in FIG. 1.

A transparent insulating film 17 is disposed between the transparent electrode 12 and the layer of the light transmissive regions 13 and the light absorbing regions 14. A transparent insulating film 18 is disposed between the transparent electrode 15 and the layer of the light transmissive regions 13 and the light absorbing regions 14. The insulating films 17 and 18 are made of $SiO_2$, for example. That is to say, the insulating films 17 and 18 are disposed between the main faces of the transparent substrates 11 and 16 opposed to each other in such a manner that each insulating film is interposed between a transparent substrate and the light absorbing regions 14.

The material of the transparent insulating films 17 and 18 is not limited to $SiO_2$ and can be a different transparent insulating material. The insulating film 17 (18) can be provided only between the transparent electrode 12 (15) on the main face of the transparent substrate 11 (16) and the light absorbing regions 14 and does not need to be provided between the light transmissive regions 13 and the transparent electrode 12 (15).

The insulating films 17 (18) interposed between the transparent electrode 12 (15) and the light absorbing regions 14 prevents the electrophoretic particles 140 from firmly sticking to the transparent electrode 12 (15) even after the electrophoretic particles 140 are collected around the transparent electrode 12 (15) for a long time. As a result, the transition characteristics between a wide viewing angle state and a narrow viewing angle state are more stabilized.

In another configuration example, either one or both of the transparent electrodes 12 and 15 can be a patterned electrode. Its pattern can be identical to the pattern of the light absorbing regions 14 when viewed planarly. The patterned transparent electrode achieves reduction in area of the transparent electrode to improve the transmissivity of the light beam direction control panel 10. In still another example, the patterned electrode that collects the electrophoretic particles 140 in a wide viewing angle state can be made of a light reflective metal.

Figure 4A:
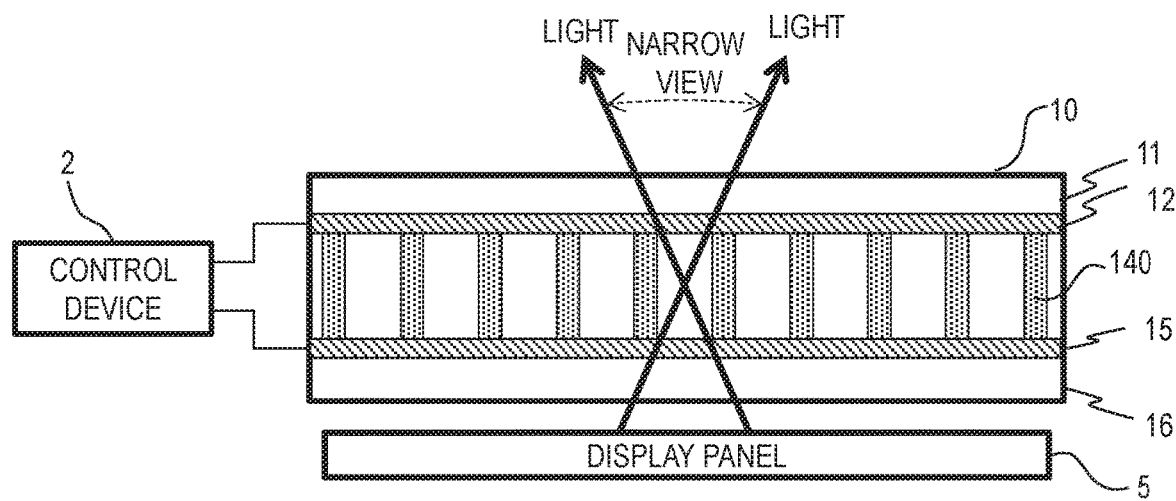
FIG. 4A illustrates a configuration example of a display device including a light beam direction control device in a narrow viewing angle state and a display panel.
Figure 4B:
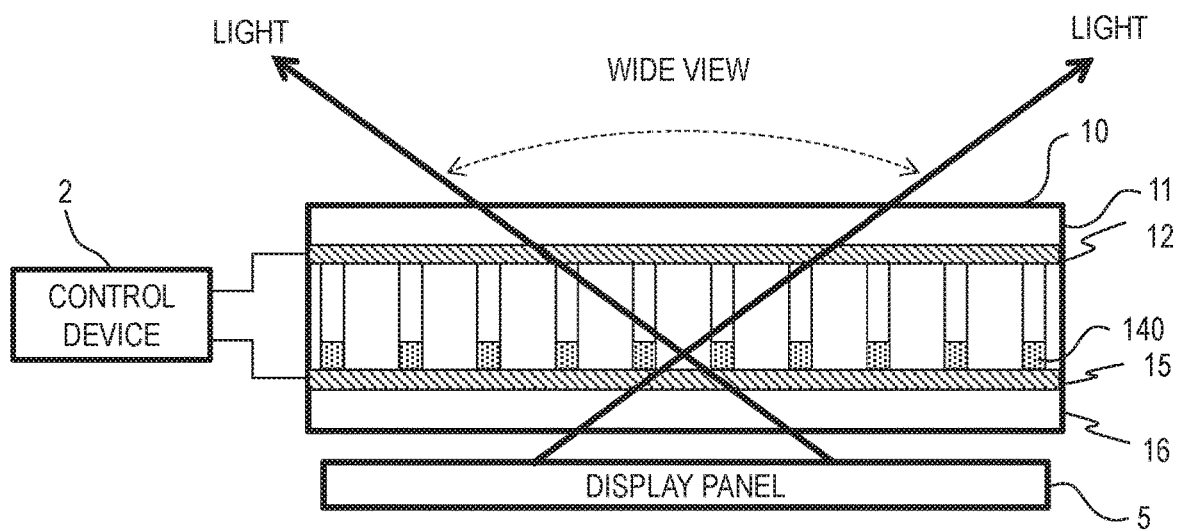
FIG. 4B illustrates a configuration example of a display device including a light beam direction control device in a wide viewing angle state and a display panel.

FIGS. 4A and 4B illustrate a configuration example of a display device including a light beam direction control device 1 and a display panel 5. The display panel 5 can be a liquid crystal display panel, an organic EL panel, an inorganic EL panel, or an LED panel. FIG. 4A illustrates a display device in a narrow viewing angle state and FIG. 4B illustrates the display device in a wide viewing angle state. In this configuration example, the display panel 5 is disposed behind the light beam direction control panel 10. The user sees the image displayed on the display panel 5 through the light beam direction control panel 10.

Hereinafter, the side on which the display device displays an image for the user or the side on which the image is seen by the user is referred to as front side and the opposite side as back side. The opposite face to the face on the front side or the front face is referred to as rear face or back face.

The light beam direction control panel 10 may be disposed in front of a planar light source. In a display device including a backlight (planar light source) like a liquid crystal display device, the light beam direction control panel 10 may be disposed between the liquid crystal display panel and the backlight.

FIG. 4A illustrates a narrow viewing angle state; the electrophoretic particles 140 are uniformly dispersed in the dispersion medium 141. FIG. 4B illustrates a wide viewing angle state; the electrophoretic particles 140 are gathered in the proximity of one transparent electrode 15. The control device 2 changes the distribution of the electrophoretic particles 140 in the light beam direction control panel 10 to switch the viewing angle that allows observation of the displayed image between a narrow state and a wide state.

Transmissivity of Light Beam direction Control Panel

Figure 5A:
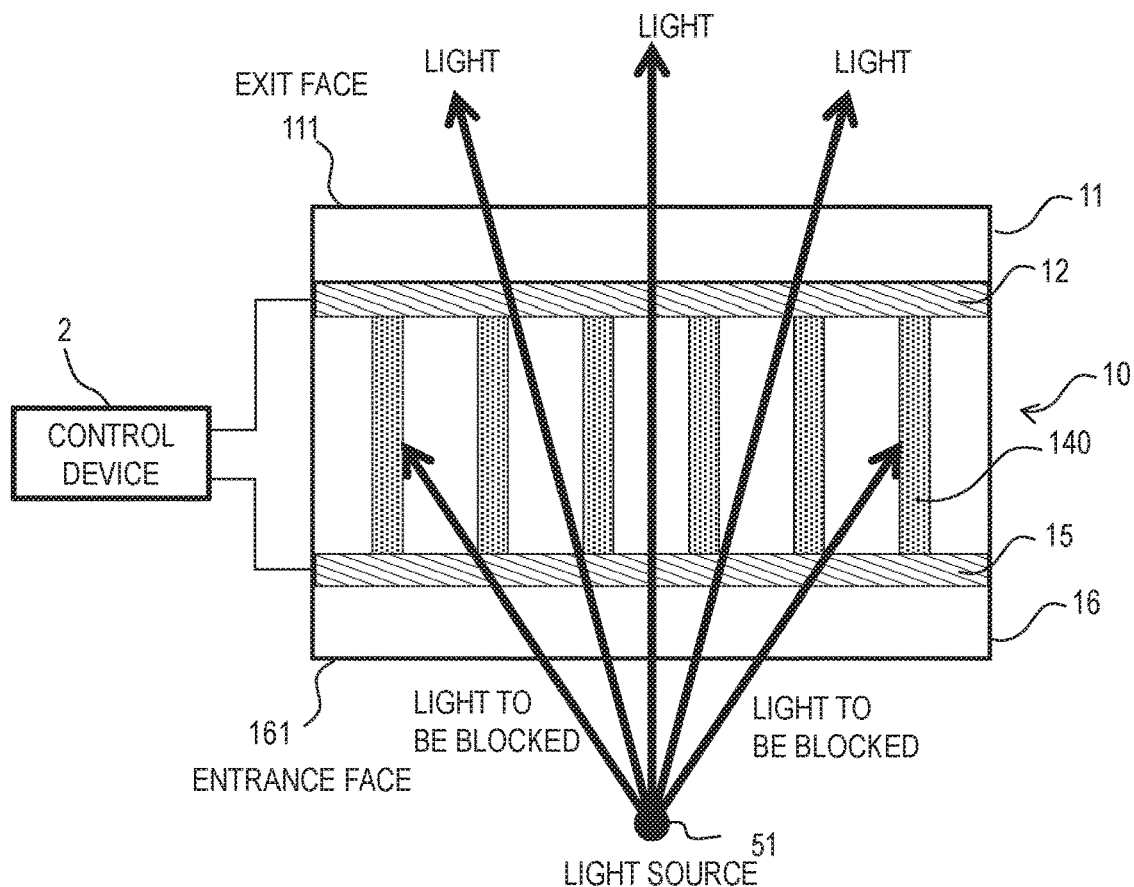
FIG. 5A is a cross-sectional diagram illustrating the angle of light that is emitted by a light source, enters a light beam direction control panel from its entrance face, and goes out from its exit face in a narrow viewing angle state.
Figure 5B:
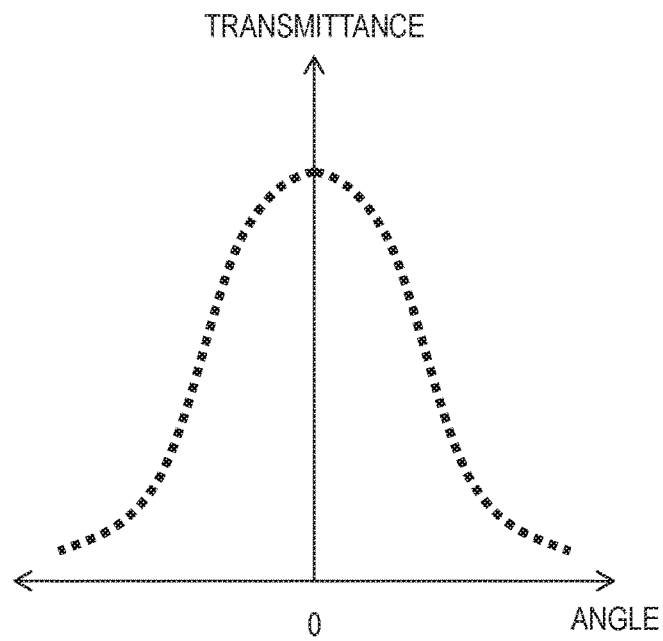
FIG. 5B illustrates a relation between the angle of outgoing light and the transmittance.

The transmissivity in a narrow viewing angle state and the transmissivity in a wide viewing angle state are described. FIG. 5A is a cross-sectional diagram illustrating the angle of light that is emitted by a light source, enters the light beam direction control panel 10 from its entrance face 161, and goes out from its exit face 111 in a narrow viewing angle state. FIG. 5B illustrates a relation between the angle of outgoing light and the transmittance. The angle is the angle with respect to the normal to the light beam direction control panel 10. In a narrow viewing angle state, the control device 2 does not apply voltage across the transparent electrode 12 and the transparent electrodes 15, so that no electric field is applied to the electrophoretic elements.

When the narrow viewing angle state is stable, the electrophoretic particles 140 are completely dispersed in the light absorbing regions 14. Since the electrophoretic particles 140 are in a color having a light-blocking property, such as black, the light that hits the electrophoretic particles 140 in the light that comes from the entrance face 161 of the light beam direction control panel 10 is absorbed and does not go out from the light beam direction control panel 10. Accordingly, the transmittance with respect to the angle of outgoing light is as indicated in FIG. 5B.

Figure 6A:
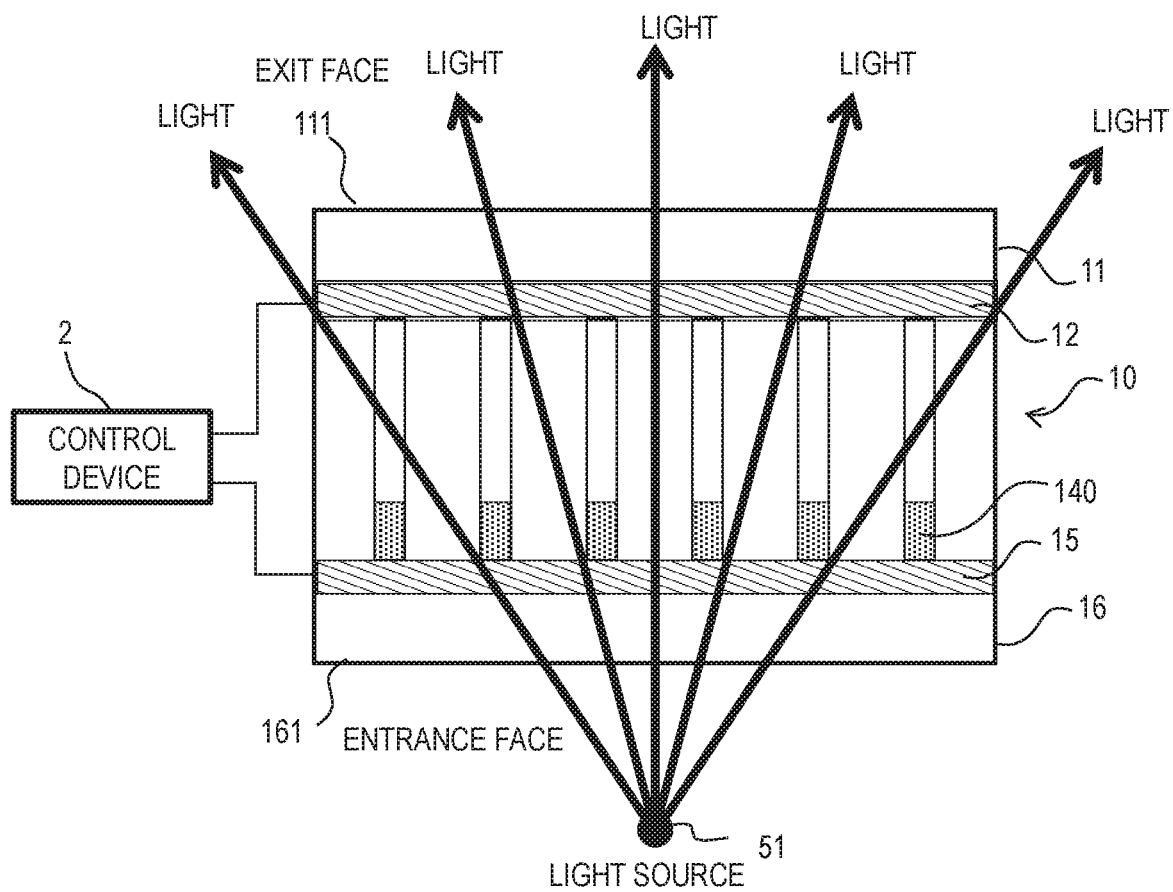
FIG. 6A is a cross-sectional diagram illustrating the angle of light that is emitted by a light source, enters a light beam direction control panel from its entrance face, and goes out from its exit face in a wide viewing angle state.
Figure 6B:
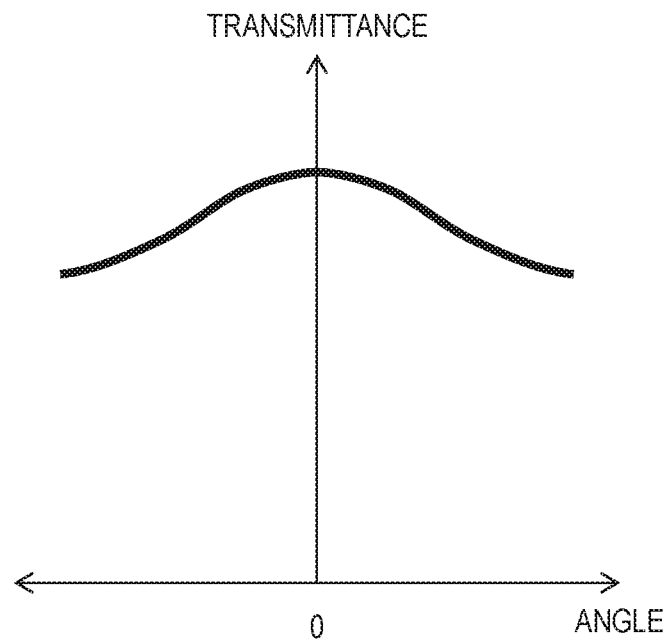
FIG. 6B illustrates a relation between the angle of outgoing light and the transmittance.

FIG. 6A is a cross-sectional diagram illustrating the angle of light that is emitted by a light source, enters the light beam direction control panel 10 from its entrance face 161, and goes out from its exit face 111 in a wide viewing angle state. FIG. 6B illustrates a relation between the angle of outgoing light and the transmittance. The angle is the angle with respect to the normal to the light beam direction control panel 10. In a wide viewing angle state, the control device 2 applies voltage across the transparent electrode 12 and the transparent electrode 15 to apply an electric field to the electrophoretic elements.

In response to application of voltage such that the transparent electrode 15 will have a potential higher than the potential of the transparent electrode 12, the negatively charged electrophoretic particles 140 are collected to the proximity of the transparent electrode 15 having a positive potential. Accordingly, as illustrated in FIG. 6A, the light that hits the electrophoretic particles 140 in the light that comes from the entrance face 161 is a little, compared to the case of FIG. 5A. Since the dispersion medium 141 is transparent as described above, the incident light at an angle that is blocked in the narrow viewing angle state passes through the light beam direction control panel 10. Accordingly, the transmittance with respect to the angle of outgoing light is as indicated in FIG. 6B.

Figure 7:
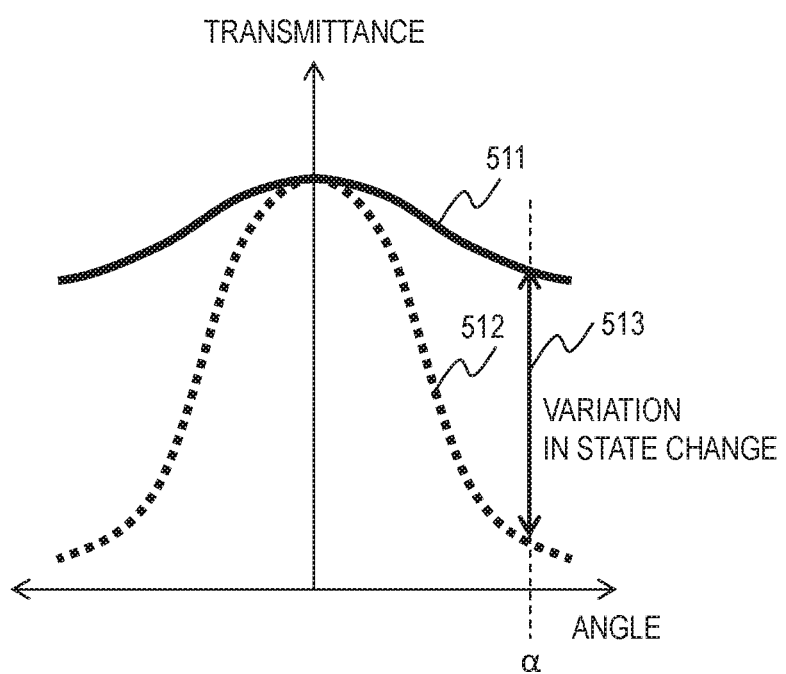
FIG. 7 is a graph illustrating the variation in transmittance between a narrow viewing angle state and a wide viewing angle state.

FIG. 7 is a graph illustrating the variation in transmittance between a narrow viewing angle state and a wide viewing angle state. In the graph of FIG. 7, the solid line 511 represents the relation between the angle and the transmittance in a wide viewing angle state and the broken line 512 represents the relation between the angle and the transmittance in a narrow viewing angle state. As the viewing angle changes from a narrow viewing angle or a wide viewing angle to the other in accordance with the potential control of the transparent electrode 12 and the transparent electrode 15, the transmittance at each angle changes from the value of the line 512 to the value of the line 511 or from the value of the line 511 to the value of the line 512. For example, at an angle α, the transmittance changes as indicated by the arrowed line 513 between the wide viewing angle state and the narrow viewing angle state.

Behavior of Electrophoretic Particles

Hereinafter, the behavior of electrophoretic particles 140 in an electrophoretic element is described more specifically. The electrophoretic element is designed so that the repulsion between electrophoretic particles 140 generated by their electric charge is higher than the attraction acting thereon.

Figure 8A:
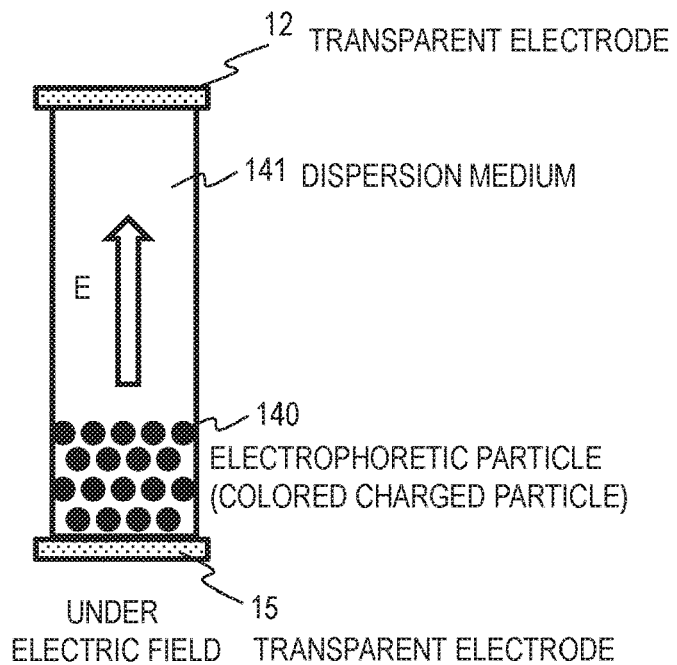
FIG. 8A schematically illustrates the state of an electrophoretic element when voltage is applied across the transparent electrodes.
Figure 8B:
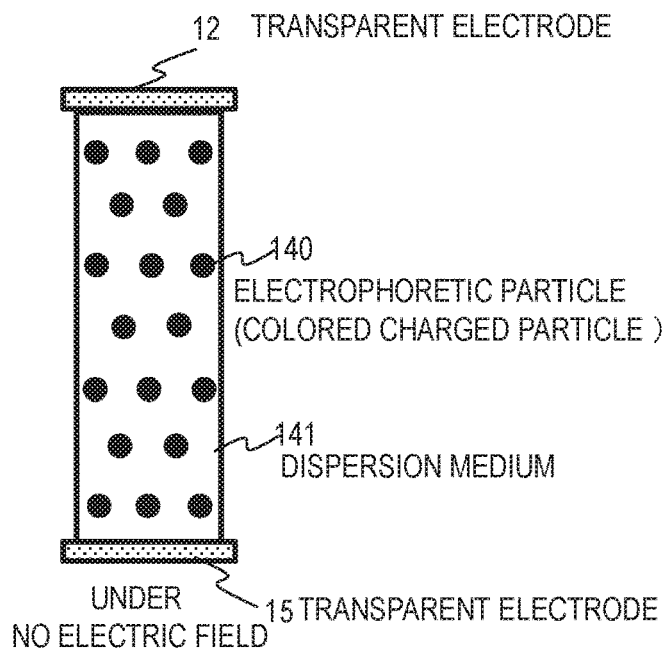
FIG. 8B schematically illustrates the state of an electrophoretic element when no voltage is applied across the transparent electrodes.

FIG. 8A schematically illustrates the state of an electrophoretic element when voltage (electric field) is applied across the transparent electrodes 12 and 15. FIG. 8B schematically illustrates the state of the electrophoretic element when no voltage (electric field) is applied across the transparent electrodes 12 and 15.

When an electric field exists between the transparent electrodes 12 and 15, the negatively charged electrophoretic particles 140 gather to the proximity of the electrode having a higher potential or the transparent electrode 15, as schematically illustrated in FIG. 8A. When no electric field exists, the most stable state of the electrophoretic particles 140 is a state (completely dispersed state) where the electrophoretic particles 140 are dispersed within the dispersion medium in a macroscopically uniform density because of the repulsion on one another, as schematically illustrated in FIG. 8B.

The light beam direction control panel 10 achieves its wide viewing angle state with the electrophoretic particles 140 collected by application of an electric field and achieves its narrow viewing angle state with the electrophoretic particles 140 diffused under no electric field. As described above, the most stable state in a narrow viewing angle state is a state where the density of the electrophoretic particles 140 are macroscopically uniform. However, the electrophoretic particles 140 behave intricately until reaching the stable state because of the hydrodynamic effects or electrostatic interaction.

Figure 9:
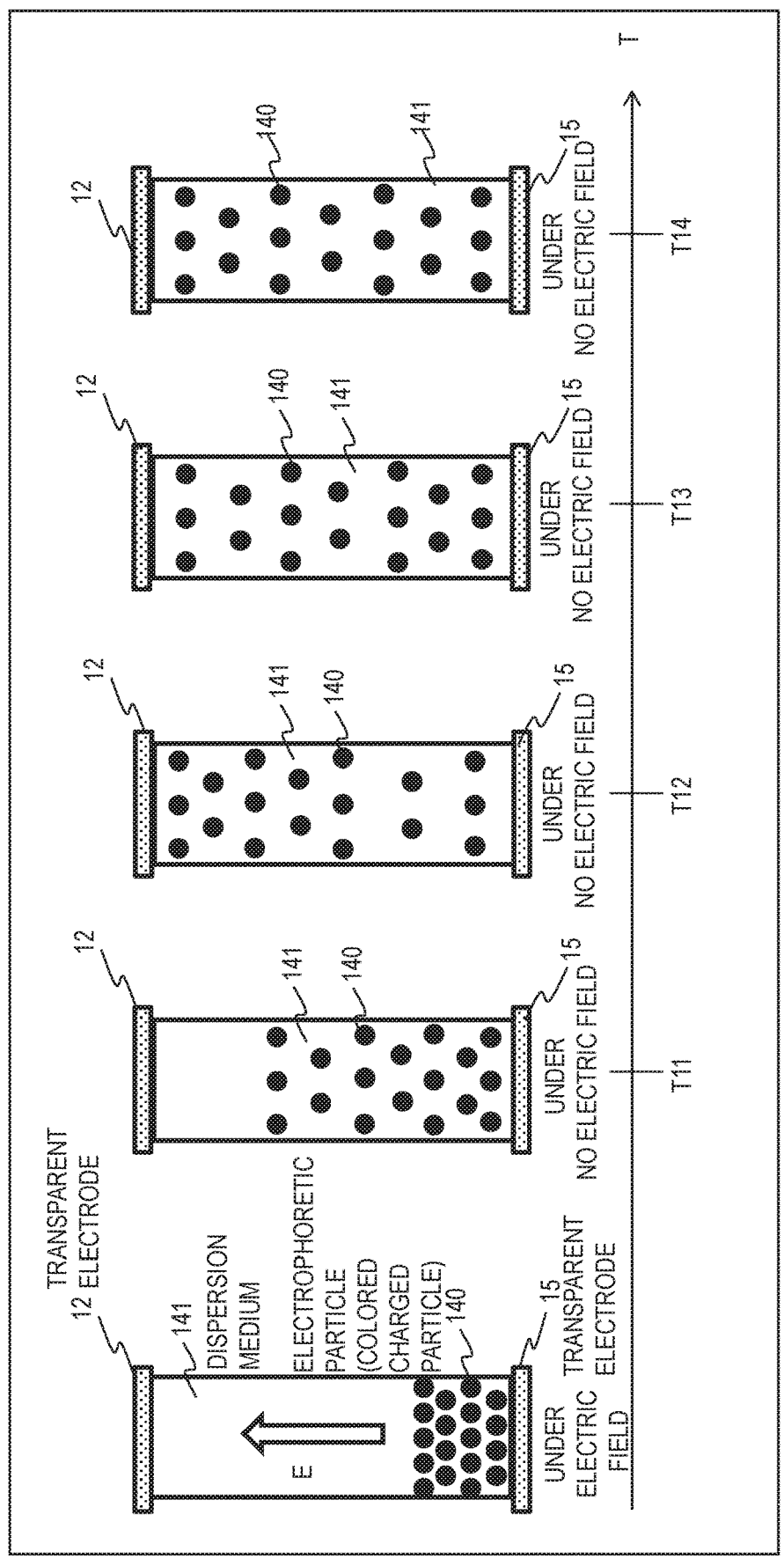
FIG. 9 illustrates the behavior of electrophoretic particles.

Presuming the damping vibration behavior of the electrophoretic particles 140 as a simple model, the behavior of the electrophoretic particles 140 is illustrated in FIG. 9. Upon vanishment of the electric field applied across the electrodes, the electrophoretic particles 140 start diffusing toward the electrode opposite from the electrode around which the electrophoretic particles 140 have been collected (T11). Subsequently, the density of the electrophoretic particles 140 becomes higher in the area closer to the opposite electrode than the area closer to the original electrode. For this reason, some electrophoretic particles 140 move toward the original electrode because of the repulsion (T12).

Some time later, even if all electrophoretic particles 140 look like uniformly distributed, it can be considered that the individual electrophoretic particles 140 are vibrating (T13, T14). In other words, even if the angular distribution of the transmitted light has become unchanged (a narrow viewing angle state) under the condition of no electric field, it can be considered that each electrophoretic particle 140 keeps vibrating minutely.

Accordingly, in re-applying an electric field to change the electrophoretic particles 140 (light beam direction control panel 10) from the narrow viewing angle state to a wide viewing angle state, the response time is different depending on the magnitude of the vibration. Specifically, an electrophoretic particle 140 at least moving a little moves faster than a completely static electrophoretic particle 140. That is to say, in changing the light beam direction control panel 10 that has stayed in a narrow viewing angle state for a long time to a wide viewing angle state, applying the same voltage for the same time as those to change the light beam direction control panel 10 that has been in a narrow viewing angle state for a short time to a wide viewing angle state cannot attain the desired transmittance.

From another point of view, the response characteristic of an electrophoretic element could change with temperature. The motion of an electrophoretic particle 140 in an electric field depends on the mobility (electrophoretic mobility μ). The motion of an electrophoretic particle (charged particle) 140 having an electric charge amount q is accelerated by receiving a force qE from an electric field E but eventually, becomes uniform motion because of the balance with the viscous resistance of the liquid (dispersion medium 141). When a charged particle having a radius a moves in a liquid having a viscosity η at a velocity v, it receives a resistive force of 6πηav. The value obtained by dividing the velocity v by E is the electrophoretic mobility μ. Accordingly, the following formulae (1) to (3) can be obtained:

$$qE = 6\pi\eta\ av \qquad (1)$$

$$v = \frac{qE}{6\pi\eta a} \qquad (2)$$

$$\mu = \frac{v}{E} = \frac{1}{6\pi\eta a} \qquad (3)$$

The viscosity of the liquid depends on the temperature of the liquid. Accordingly, the mobility of an electrophoretic particle 140 has temperature dependency. For this reason, in changing an electrophoretic element (the light beam direction control panel 10) from a narrow viewing angle state to a wide viewing angle state, the response time is different depending on the environmental temperature. Specifically, in changing the light beam direction control panel 10 to a wide viewing angle state under a low environmental temperature, the desired transmittance cannot be attained by applying the same voltage for the same time as those to change the light beam direction control panel 10 to a wide viewing angle state under a high environmental temperature.

The response characteristic of transmittance to applied voltage of an electrophoretic element (light beam direction control panel 10) can be different depending on not only the temperature and the period without application of voltage but also the humidity and the frequency of operation of the electrophoretic element. Accordingly, in changing the light beam direction control panel 10 from a narrow viewing angle state to a wide viewing angle state, the response characteristic of the transmittance of the light beam direction control panel 10 to the voltage applied across the transparent electrodes 12 and 15 can be different depending on the conditions of the environment or the electrophoretic elements.

Response Characteristic of Transmittance

Figure 10:
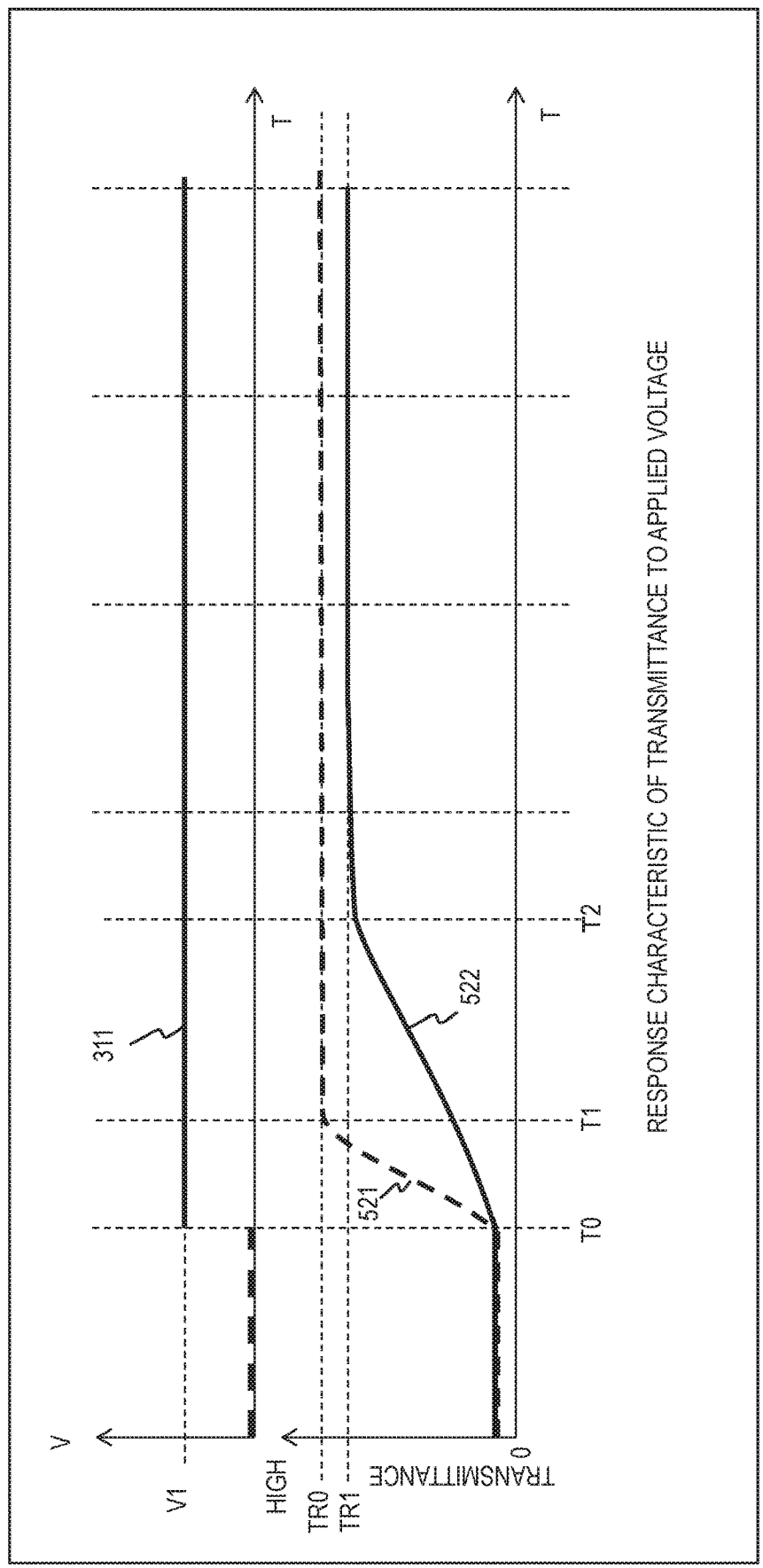
FIG. 10 schematically illustrates examples of the response characteristic of transmittance to applied voltage desired for a light beam direction control panel and a response characteristic of transmittance changed because of the condition of the environment or the electrophoretic elements.

FIG. 10 schematically illustrates examples of the response characteristic of transmittance to applied voltage desired for the light beam direction control panel 10 and a response characteristic of transmittance changed because of the condition of the environment or the electrophoretic elements. Specifically, FIG. 10 includes a graph providing a relation between elapsed time in a certain period and applied voltage and a graph providing relations between the elapsed time and transmittance. The time axes of the two graphs are the same. In the graph of transmittance, the broken line 512 represents the desired transmittance response characteristic and the solid line 522 represents the transmittance response characteristic changed from the desired one.

The voltage 311 applied to the light beam direction control panel 10 is changed from 0 to V1 at a time T0 and thereafter, maintained at V1. The voltage value V1 can be +5 V. For example, the transparent electrode 12 is provided with the ground potential of a reference potential and the transparent electrode 15 is provided with a potential of +5 V.

In the desired transmittance response characteristic 521, the transmittance starts increasing at the time T0 and reaches the target value TR0 at a time T1. In the transmittance response characteristic 522 changed from the desired one, the transmittance starts increasing at the time T0 and reaches a value TR1 at a time T2. The time T2 is later than the time T1 and the transmittance TR1 is lower than the transmittance TR0. Because of a long period without application of voltage or a low-temperature environment, the transmittance response characteristic of the light beam direction control panel 10 may change from the desired transmittance response characteristic 521 to the transmittance response characteristic 522.

Feedback Control Based on Measured Luminance of Transmitted Light

The control device 2 in this disclosure measures the light transmitted through the light beam direction control panel 10 after starting application of voltage to the light beam direction control panel 10 to change the viewing angle from a narrow viewing angle to a wide viewing angle and controls the voltage to be applied based on the measurement result. As a result, the light beam direction control panel 10 can speedily change from a narrow viewing angle state to a wide viewing angle state.

Figure 11A:
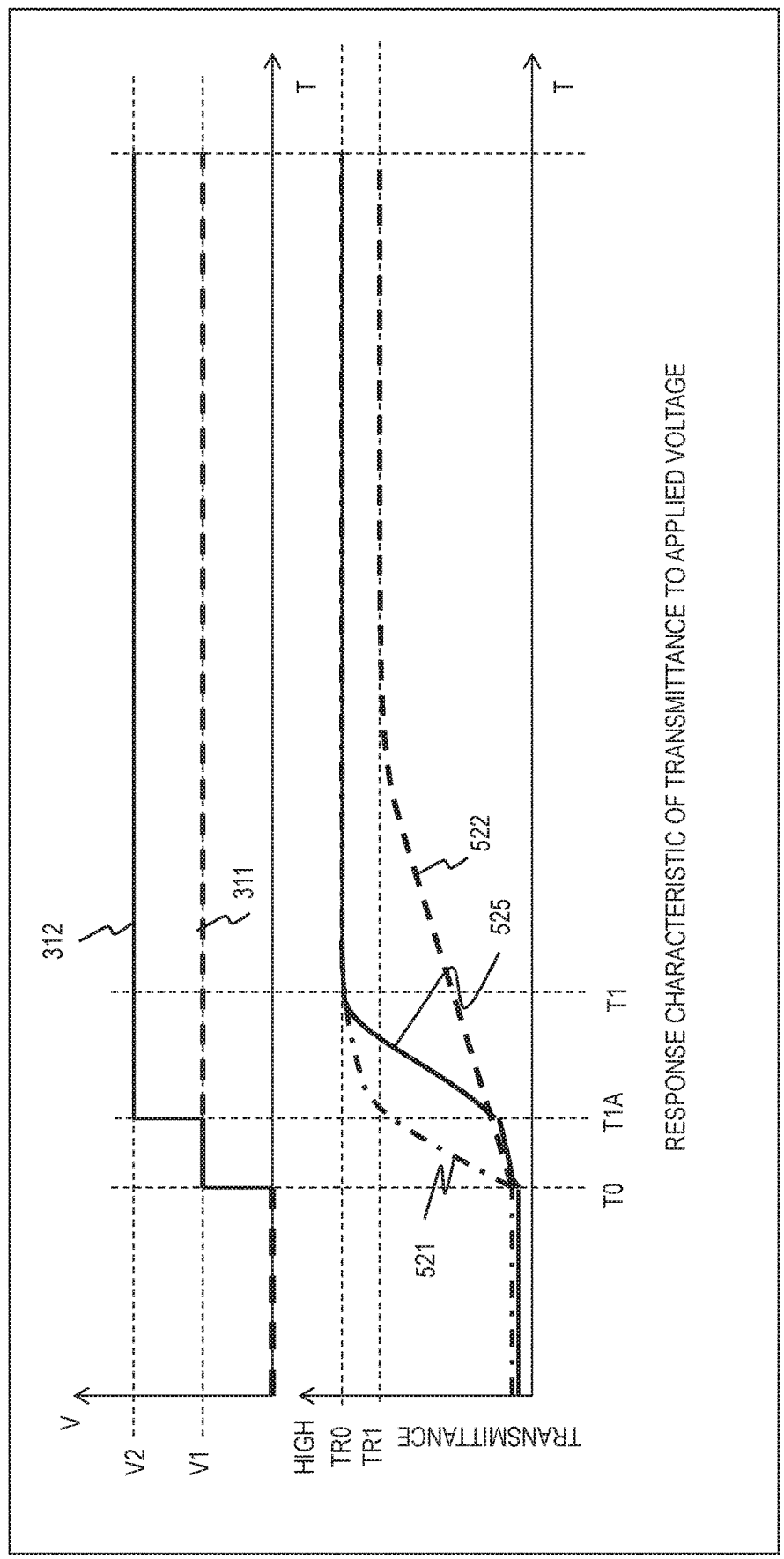
FIG. 11A illustrates an example of feedback control of the voltage to be applied that is performed by a control device.

FIG. 11A illustrates an example of the feedback control of the voltage to be applied that is performed by the control device 2. FIG. 11A includes a graph providing relations between elapsed time in a certain period and applied voltage and a graph providing relations between the elapsed time and transmittance. The time axes of the two graphs are the same. The solid line 312 in the graph of applied voltage represents the applied voltage feedback-controlled by the control device 2. The solid line 525 in the graph of transmittance represents the transmittance response characteristic to the applied voltage 312.

The control device 2 starts applying a positive voltage V1 (direct voltage at a first voltage value) to the light beam direction control panel 10 at a time T0 to change the light beam direction control panel 10 from a narrow viewing angle state to a wide viewing angle state. The control device 2 measures the luminance of the transmitted light from the light beam direction control panel 10 at a time T1A. If the luminance of the transmitted light from the light beam direction control panel 10 has reached the target value at the time T1A, the control device 2 maintains the voltage V1.

The control device 2 holds information on the target value for the luminance of the transmitted light in advance. The information on the target value can directly indicate the luminance value of the transmitted light to be measured or indicate the required transmittance value. The control device 2 calculates the transmittance of the light beam direction control panel 10 from the measured luminance of the transmitted light and the luminance of the original light from the light source and compares the calculated value with the required transmittance. Whether the luminance of the transmitted light has reached the target value can be determined by such calculation of the transmittance of the light beam direction control panel 10. The same applies to the other examples of feedback control.

In the example of FIG. 11A, when the applied voltage corresponds to the broken line 311, the measured luminance of the transmitted light is lower than the target value. The control device 2 increases the voltage to be applied from V1 to V2 as indicated by the line 312 in the graph of applied voltage. For example, the voltage values V1 and V2 are +5 V and +10 V, respectively.

In the transmittance response characteristic 525 to the applied voltage 312, the transmittance increases from the time T0 to the time T1A; the rate of increase rises from the time T1A. This is caused by the increase in applied voltage from the value V1 to the value V2. The transmittance response characteristic 525 reaches a transmittance TR0 in the desired transmittance response characteristic 521 at a time T1.

This control of increasing the voltage to be applied if the measured luminance of the transmitted light from the light beam direction control panel 10 has not reached a predetermined value expedites the response of the transmittance, while saving the power consumption.

The control device 2 can be configured to determine the increment for the voltage based on the measured luminance of the transmitted light. The control device 2 can have information for relating the measured luminance of the transmitted light to the increased voltage V2. For example, the control device 2 can have a function or a table indicating the relation between the difference of the measured luminance of the transmitted light from the target value and the increment to the applied voltage V1. The control device 2 determines the voltage V2 to be applied in accordance with this information. Higher voltage V2 is assigned to lower measured luminance of transmitted light.

A specific example of the information is provided in FIG. 11B in the form of a look-up table (LUT) and operation using the LUT is described. The luminance rate of transmitted light in FIG. 11B is a value obtained by dividing the luminance of the transmitted light at the time T1A by the target luminance. When the luminance rate of the transmitted light is lower, it indicates that the luminance is more deviated from the target value. In the example of FIG. 11A, when the luminance rate is 20%, the increment to the applied voltage is determined to be 5 V with reference to the LUT of FIG. 11B. The control device 2 adds this increment to the voltage being applied and applies the increased voltage across the transparent electrodes 12 and 15.

Figure 12:
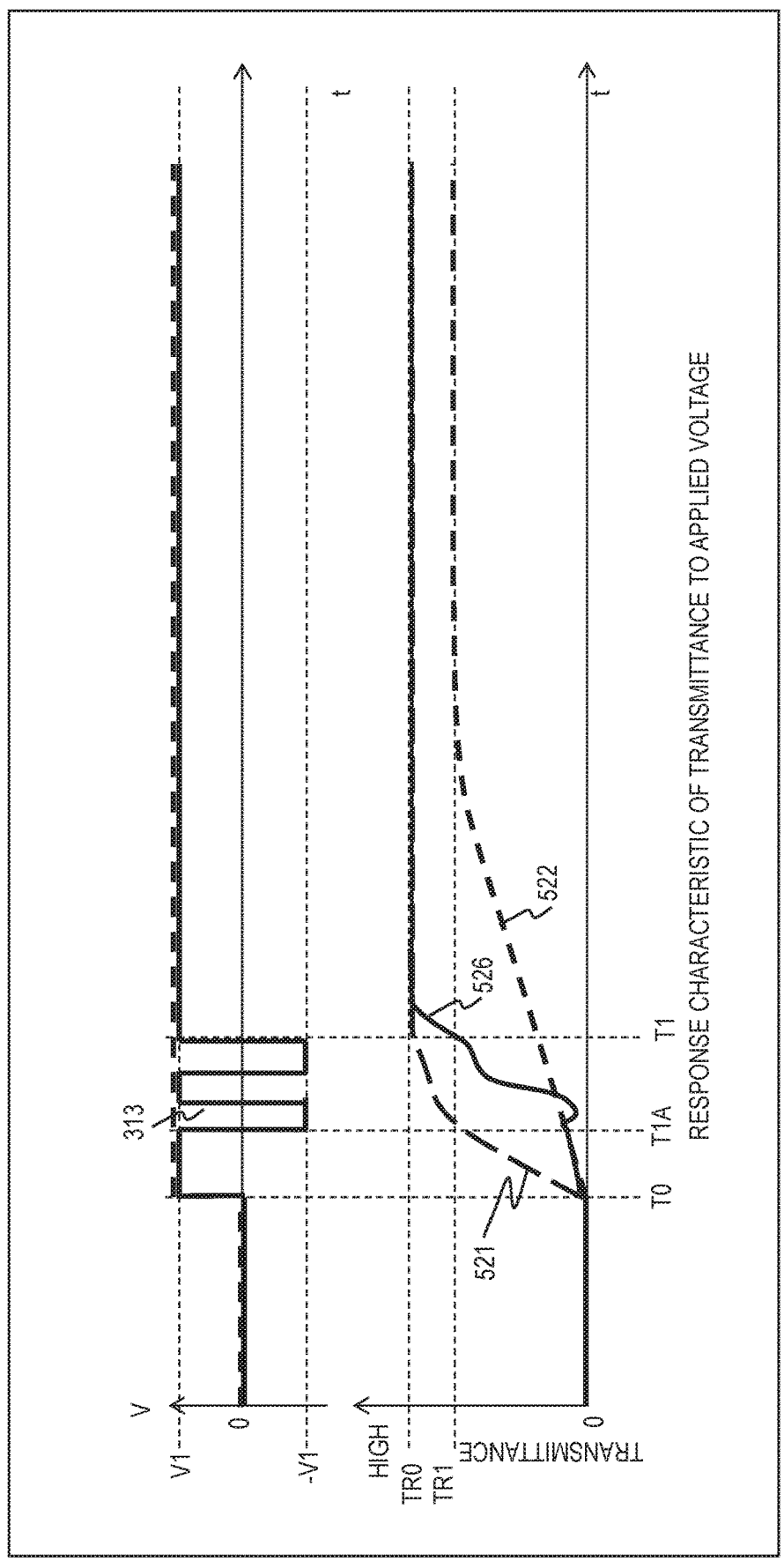
FIG. 12 illustrates another example of feedback control of the voltage to be applied that is performed by a control device.

FIG. 12 illustrates another example of the feedback control of the voltage to be applied that is performed by the control device 2. FIG. 12 includes a graph providing relations between elapsed time in a certain period and applied voltage and a graph providing relations between the elapsed time and transmittance. The time axes of the two graphs are the same. The solid line 313 in the graph of applied voltage represents the applied voltage feedback-controlled by the control device 2. The solid line 526 in the graph of transmittance represents the transmittance response characteristic to the applied voltage 313.

The control device 2 starts applying a positive voltage V1 to the light beam direction control panel 10 at a time T0 to change the light beam direction control panel 10 from a narrow viewing angle state to a wide viewing angle state. The control device 2 measures the luminance of the transmitted light from the light beam direction control panel 10 at a time T1A. The luminance of the transmitted light can be expressed in luminance. If the luminance of the transmitted light from the light beam direction control panel 10 has reached the target value at the time T1A, the control device 2 maintains the voltage V1.

In the example of FIG. 12, the measured luminance of the transmitted light is lower than the target value. The control device 2 oscillates the voltage as indicated by the solid line 313 in the graph of the applied voltage. The control device 2 applies direct voltage to the light beam direction control panel 10 from the time T0 to the time T1A and applies alternating voltage including negative voltage from the time T1A to a time T1. After the time T1, the control device 2 maintains a constant voltage.

In the example of FIG. 12, the voltage 313 applied from the time T1A to the time T1 is a non-sinusoidal alternating voltage having an amplitude of V1. Specifically, the applied voltage 313 is a rectangular voltage; the periods at a positive voltage V1 and the periods at a negative voltage −V1 are successively alternating. In the example of FIG. 12, each period at the positive voltage V1 is equal to each period at the negative voltage −V1. These periods can be different; for example, each period at the negative voltage −V1 can be shorter than each period at the positive voltage V1.

The applied voltage 313 can be a non-sinusoidal alternating voltage other than a rectangular voltage or a sinusoidal alternating voltage. The absolute values of the maximum value and the minimum value of the voltage can be different; for example, the absolute value of the minimum value can be smaller than the absolute value of the maximum value. In this disclosure, the amplitude of the alternating voltage is the difference between the average value and the maximum value or the minimum value.

In a period at a negative voltage of −V1, the electrophoretic particles 140 move in the opposite direction, compared to a period at a positive direction of +V1; accordingly, the transmittance 526 drops once. However, this movement causes the electrophoretic particles 140 to move easily; the electrophoretic particles 140 move quicker in response to the next application of the positive voltage V1, accelerating the increase of the transmittance 526. This application of alternating voltage improves the transmittance response characteristic.

The control device 2 can be configured to determine the amplitude of the alternating voltage based on the measured luminance of the transmitted light. The control device 2 can have information for relating the measured luminance of the transmitted light to the amplitude of the voltage. For example, the control device 2 can have a function or a table indicating the relation between the difference of the measured luminance of the transmitted light from the target value and the increment for the amplitude. The control device 2 determines the amplitude of the alternating voltage in accordance with this information. Larger amplitude is assigned to lower measured luminance of transmitted light.

Figure 13:
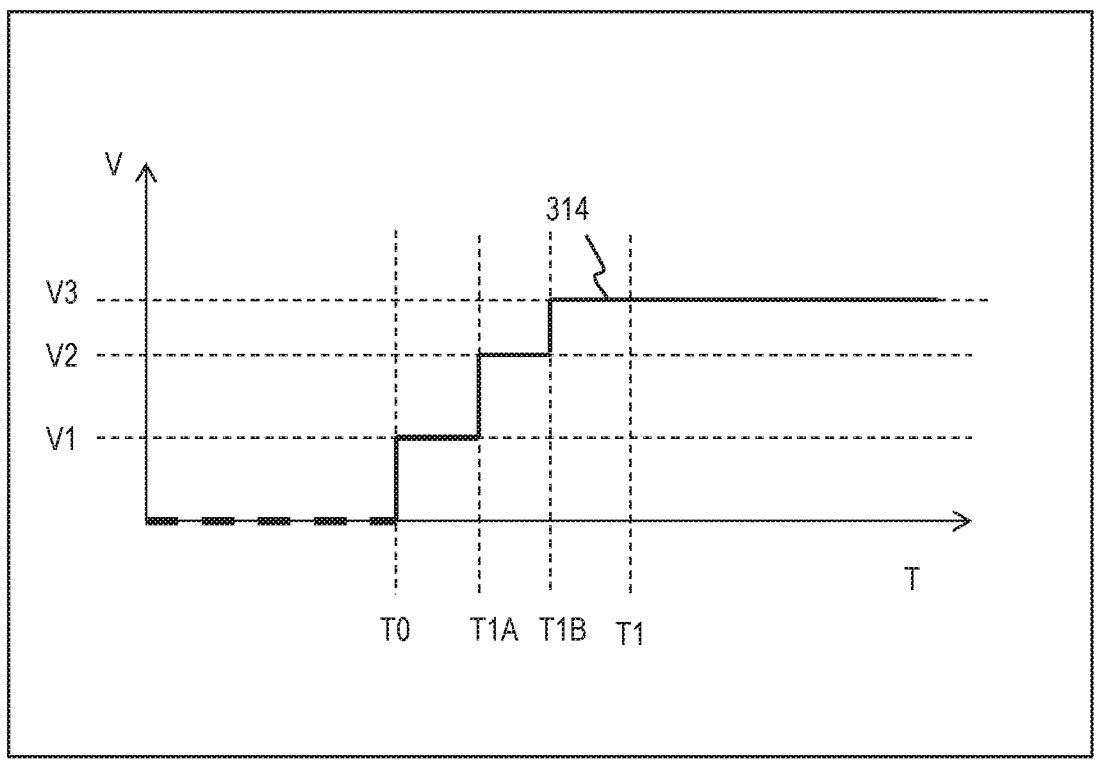
FIG. 13 illustrates still another example of feedback control of the voltage to be applied that is performed by a control device.

FIG. 13 illustrates still another example of the feedback control of the voltage to be applied that is performed by the control device 2. FIG. 13 provides a relation 314 between elapsed time and applied voltage. In this example, the control device 2 measures the luminance of the transmitted light from the light beam direction control panel 10 twice and determines the voltage to be applied based on the measurement results.

More specifically, the control device 2 starts applying a positive voltage V1 to the light beam direction control panel 10 at a time T0 to change the light beam direction control panel 10 from a narrow viewing angle state to a wide viewing angle state. The control device 2 measures the luminance of the transmitted light from the light beam direction control panel 10 at a time T1A. If the luminance of the transmitted light from the light beam direction control panel 10 has reached the target value at the time T1A, the control device 2 maintains the voltage V1.

In the example of FIG. 13, the measured luminance of the transmitted light is lower than the target value. The control device 2 increases the voltage to be applied from V1 (the first voltage value) to V2 (the second voltage value). For example, the voltage values V1 and V2 are +5 V and +10 V, respectively.

The control device 2 measures the luminance of the transmitted light from the light beam direction control panel 10 at a time T1B. If the luminance of the transmitted light from the light beam direction control panel 10 has reached the target value at the time T1B, the control device 2 maintains the voltage V2. In the example of FIG. 13, the measured luminance of the transmitted light is lower than the target value. The control device 2 increases the voltage to be applied from V2 to V3. For example, the voltage value V3 is +15 V. Thereafter, the voltage to be applied is maintained at V3.

As described above, the control device 2 measures the luminance of the transmitted light from the light beam direction control panel 10 for multiple times and at each time, increases the voltage to be applied if the measured luminance is lower than the target value. This control enables the transmittance to reach the target value more speedily, while saving the power consumption. The luminance of the transmitted light can be measured three times or more.

As described with reference to FIG. 11A, the control device 2 can determine the increment for the voltage based on the measured luminance of the transmitted light at each measurement occasion. A larger increment is assigned to lower measured luminance of transmitted light.

Figure 14:
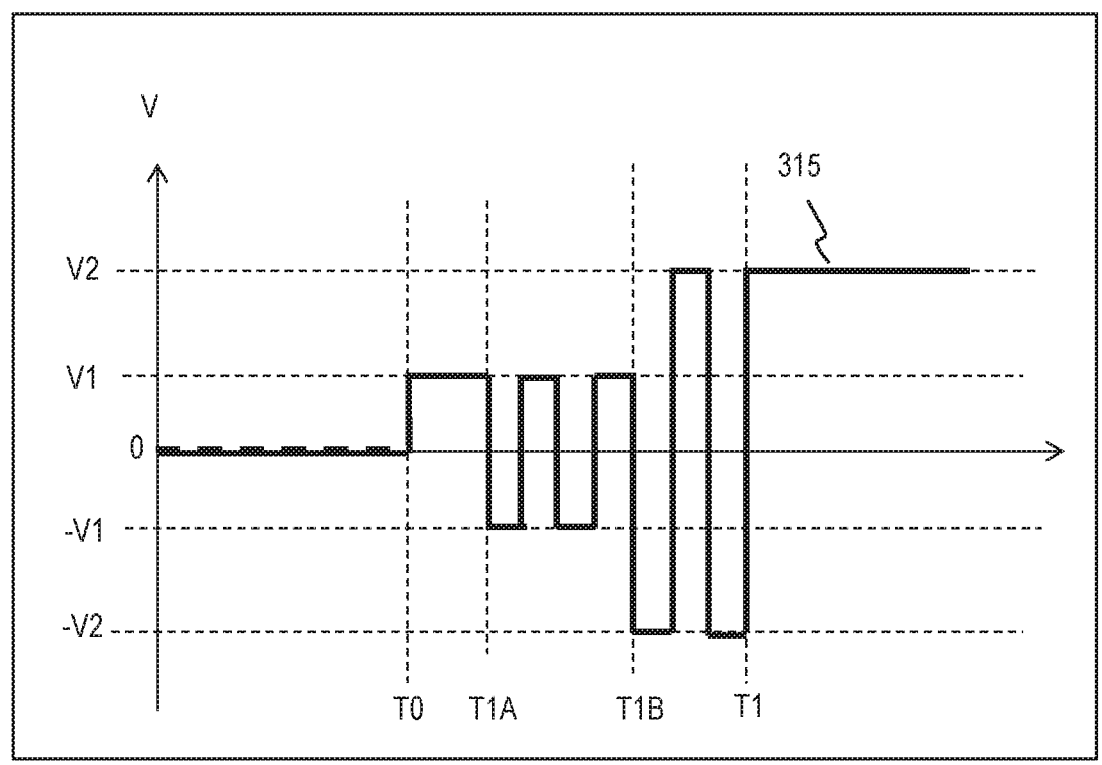
FIG. 14 illustrates still another example of feedback control of the voltage to be applied that is performed by a control device.

FIG. 14 illustrates still another example of the feedback control of the voltage to be applied that is performed by the control device 2. FIG. 14 provides a relation 315 between elapsed time and applied voltage. In this example, the control device 2 measures the luminance of the transmitted light from the light beam direction control panel 10 twice to determine the amplitude of the alternating voltage based on the measurement results.

The control device 2 starts applying a positive voltage V1 to the light beam direction control panel 10 at a time T0 to change the light beam direction control panel 10 from a narrow viewing angle state to a wide viewing angle state. The control device 2 measures the luminance of the transmitted light from the light beam direction control panel 10 at a time T1A. If the luminance of the transmitted light from the light beam direction control panel 10 has reached the target value at the time T1A, the control device 2 maintains the voltage V1.

In the example of FIG. 14, the measured luminance of the transmitted light is lower than the target value. The control device 2 oscillates the voltage. The control device 2 applies direct voltage to the light beam direction control panel 10 from the time T0 to the time T1A and applies alternating voltage including negative voltage from the time T1A to a time T1. The alternating voltage is a rectangular voltage and the maximum value is V1 and the minimum value is −V1. The amplitude is V1.

The control device 2 measures the luminance of the transmitted light from the light beam direction control panel 10 at a time T1B. If the luminance of the transmitted light from the light beam direction control panel 10 has reached the target value at the time T1B, the control device 2 maintains the alternating voltage having an amplitude of V1.

In the example of FIG. 14, the measured luminance of the transmitted light is lower than the target value. Therefore, the control device 2 increases the amplitude of the alternating voltage. In the example of FIG. 14, the amplitude is increased from V1 to V2. For example, V1 can be +5 V and V2 can be +10 V. The control device 2 applies a rectangular voltage having an amplitude of V2 to the light beam direction control panel 10 from the time T1B to the time T1 and applies a direct voltage V2 from the time T1.

As described above, the control device 2 measures the luminance of the transmitted light from the light beam direction control panel 10 for multiple times and at each time, increases the amplitude of the alternating voltage if the measured luminance is lower than the target value. This control enables the transmittance to reach the target value more speedily, while saving the power consumption. The luminance of the transmitted light can be measured three times or more.

As described with reference to FIG. 12, the control device 2 can determine the increment for the amplitude based on the measured luminance of the transmitted light at each measurement occasion. A larger increment is assigned to lower measured luminance of transmitted light.

Disposition of Photosensor

Figure 15:
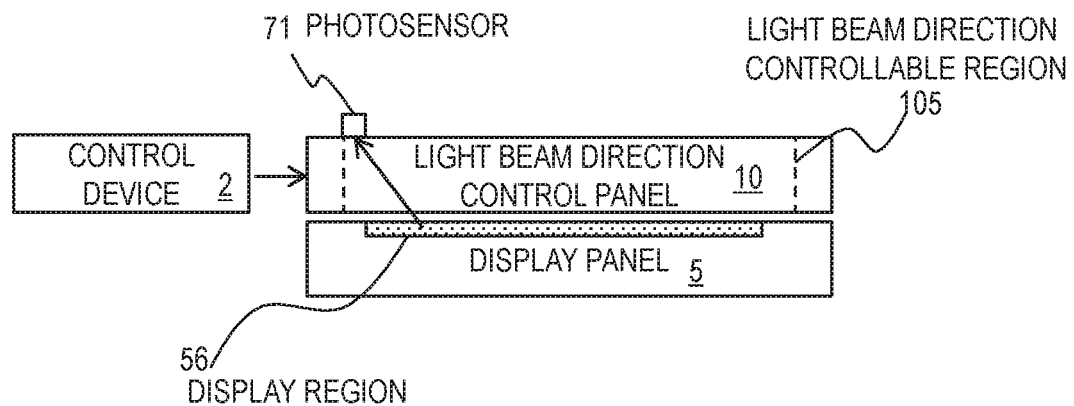
FIG. 15 illustrates an example of the disposition of a photosensor for measuring the luminance of transmitted light from the light beam direction control panel.

FIG. 15 illustrates an example of the disposition of a photosensor for measuring the luminance of transmitted light from the light beam direction control panel 10. The display device in FIG. 15 includes a display panel 5 and a light beam direction control panel 10 disposed in front of the display panel 5. The photosensor 71 is disposed on the front face of the light beam direction control panel 10. The light receiving face of the photosensor 71 is on the back side; in other words, it is facing the main face of the light beam direction control panel 10.

The photosensor 71 measures the light emitted from the display panel 5 and transmitted through the light beam direction control panel 10. That is to say, the photosensor 71 measures the luminance of the light transmitted through the light beam direction control panel 10 out of the light emitted from the display panel 5.

In the example of FIG. 15, the photosensor 71 is disposed outside the display region 56 of the display panel 5 when viewed planarly. This disposition prevents the photosensor 71 from becoming an obstacle for the displayed image. In the example of FIG. 15, the photosensor 71 is disposed within the light beam direction controllable region 105 of the light beam direction control panel 10 when viewed planarly. The light beam direction controllable region 105 is a region where the angle range of the transmitted light is controllable. The photosensor 71 can be disposed outside the light beam direction controllable region 105.

For example, the control device 2 calculates the transmittance of the light beam direction control panel 10 from the intensity of light measured by the photosensor 71. The control device 2 calculates the transmittance of the light beam direction control panel 10 from the information on the luminance of the display panel 5 acquired from the host control device and the value measured by the photosensor 71. The information on the luminance of the display panel 5 can be an average value of the luminance of the entirety or a predetermined partial region of the display region 56.

In another example, a light source for the measurement can be provided within the display panel 5 or between the display panel 5 and the light beam direction control panel 10. The photosensor 71 measures the light emitted from the measurement light source and transmitted through the light beam direction control panel 10. Since the luminance of the measurement light source is known in advance, the control device 2 can easily identify the relation between the value measured by the photosensor 71 and the target value. The light beam direction control device 1 can include multiple photosensors. The control device 2 controls the voltage to be applied to the light beam direction control panel 10 based on the average of the measurement results of the multiple photosensors. This configuration enables more accurate control.

Figure 16:
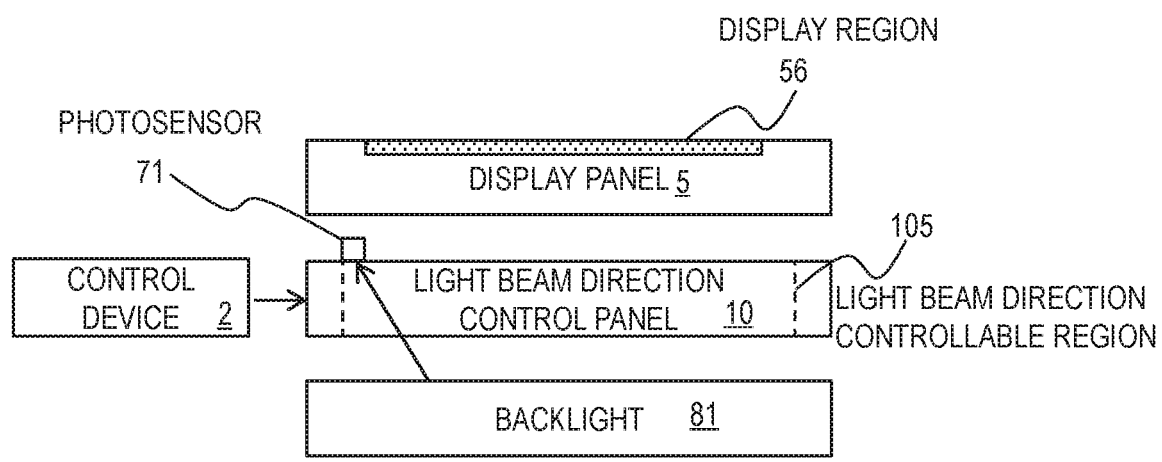
FIG. 16 illustrates another example of the disposition of a photosensor for measuring the luminance of transmitted light through the light beam direction control panel.

FIG. 16 illustrates another example of the disposition of a photosensor for measuring the luminance of transmitted light from the light beam direction control panel 10. The display device in FIG. 16 includes a backlight 81, a display panel 5 disposed in front of the backlight 81, and a light beam direction control panel 10 disposed between the backlight 81 and the display panel 5.

The display panel 5 is a display panel that displays an image by controlling transmission of the light emitted from the backlight 81; it can be a liquid crystal display panel. The light beam direction control panel 10 controls the angle range of the light emitted from the backlight 81 to control the viewing angle of the display panel 5.

The photosensor 71 is disposed on the front face of the light beam direction control panel 10. The light receiving surface of the photosensor 71 is on the back side. In other words, the photosensor 71 is facing the main face of the light beam direction control panel 10. The photosensor 71 measures the light emitted from the backlight 81 and transmitted through the light beam direction control panel 10. In other words, the photosensor 71 measures the luminance of the light transmitted through the light beam direction control panel 10 out of the light emitted from the backlight 81.

In the example of FIG. 16, the photosensor 71 is disposed outside the display region 56 of the display panel 5 when viewed planarly. This disposition prevents the photosensor 71 from becoming an obstacle for the displayed image. In the example of FIG. 16, the photosensor 71 is disposed within the light beam direction controllable region 105 of the light beam direction control panel 10 when viewed planarly. The photosensor 71 can be disposed outside the light beam direction controllable region 105.

In the case where the luminance of the backlight 81 is fixed, the control device 2 can directly compare the value measured by the photosensor 71 with a predetermined target value and control the voltage for the light beam direction control panel 10 based on the comparison result. In the case where the luminance of the backlight 81 is variable, the control device 2 calculates the transmittance of the light beam direction control panel 10 from the information on the luminance of the backlight 81 acquired from the host control device and the value measured by the photosensor 71. The control device 2 compares the calculated transmittance with the target value. The control device 2 can also calculate the transmittance in the case where the luminance of the backlight 81 is fixed.

Circuit Configuration

Figure 17:
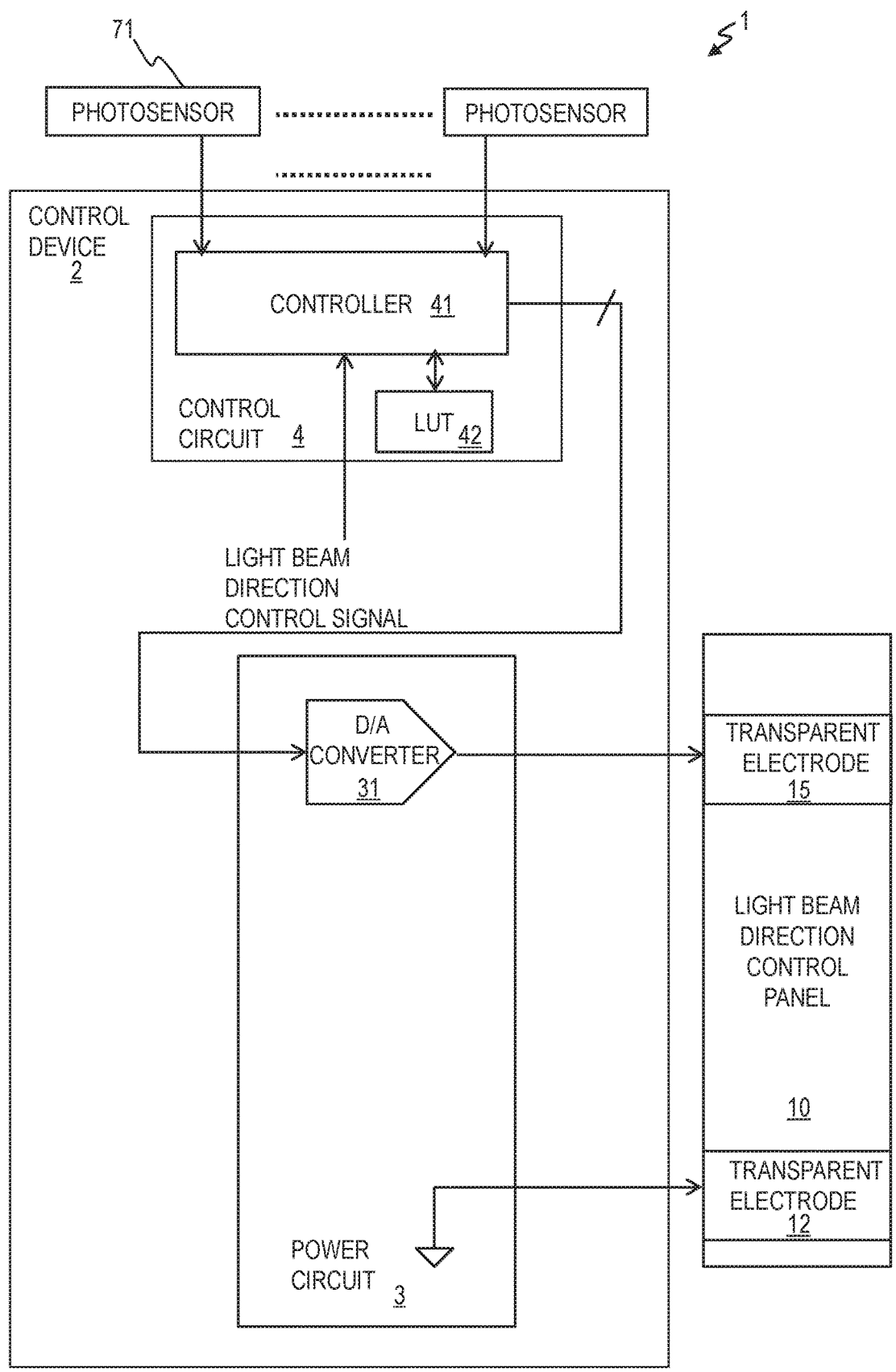
FIG. 17 schematically illustrates an example of the circuit configuration of the light beam direction control device.

FIG. 17 schematically illustrates an example of the circuit configuration of the light beam direction control device 1. The light beam direction control device 1 includes a plurality of photosensors 71. In FIG. 17, only one of the photosensors is provided with a reference sign 71 by way of example. The control circuit 4 includes a controller 41 and a look-up table (LUT) 42. The power circuit 3 includes a DA converter 31. The output of the DA converter 31 is provided to the transparent electrode 15. The power circuit 3 provides the ground potential to the transparent electrode 12 as a reference potential.

Each photosensor 71 measures transmitted light from the light beam direction control panel 10. The controller 41 determines a potential to be given to the transparent electrode 15 based on the information in the look-up table 42 and the values measured by the photosensors 71, and inputs data indicating the determined potential to the DA converter 31. The DA converter 31 provides the potential specified by the controller 41 to the transparent electrode 15. Since the transparent electrode 12 in this example is at the ground potential, the potential of the transparent electrode 15 corresponds to the voltage across the transparent electrodes 12 and 15.

Specific operation is described as follows. The control circuit 4 calculates an average of the measured values acquired from the plurality of photosensors 71. The controller 41 consults the LUT 42 with the calculated average, selects a potential associated with the average as the potential to be provided to the transparent electrode 15, and sends a potential signal to the power circuit 3. The power circuit 3 outputs a potential from the DA converter 31 based on the potential signal to apply voltage across the transparent electrodes 15 and 12 of the light beam direction control panel 10.

The look-up table 42 provides information to determine the potential to be provided to the transparent electrode 15 from the values measured by the photosensors 71. For the example described with reference to FIG. 11A, the look-up table 42 may provide relations of ranges of the difference between the measured transmittance and the target value to voltages to be applied to the light beam direction control panel 10. For the example described with reference to FIG. 12, the look-up table 42 may provide relations of ranges of the difference between the measured transmittance and the target value to amplitudes of the alternating voltage to be applied to the light beam direction control panel 10.

For the example described with reference to FIG. 13, the look-up table 42 may provide relations of ranges of the difference between the measured transmittance and the target value to increments for the voltage applied to the light beam direction control panel 10 in individual measurement occasions. For the example described with reference to FIG. 14, the look-up table 42 may provide relations of ranges of the difference between the measured transmittance and the target value to increments for the amplitude of the alternating voltage applied to the light beam direction control panel 10 in individual measurement occasions.

In place of the look-up table 42, the controller 41 can internally hold the information in the look-up table 42. The information can be in the form of a table or a function. The look-up table 42 can be updated in accordance with an instruction from the external such as the manufacturer or the user. The power circuit 3 can include a voltage-dividing circuit for applying multiple potentials and a selector for selecting one of the potentials, in place of the DA converter 31. The controller 41 selects a potential to be applied to the transparent electrode 15 by controlling the selector.

In the example in FIG. 17, the potential of the transparent electrode 12 is fixed. Unlike this example, the controller 41 may change the potentials of both transparent electrodes 12 and 15 depending on the transmitted light from the light beam direction control panel 10. The behavior of the electrophoretic particles 140 is determined by the voltage across the transparent electrodes 12 and 15.

Embodiment 2

Feedback Control Based on Temperature

Figure 18:
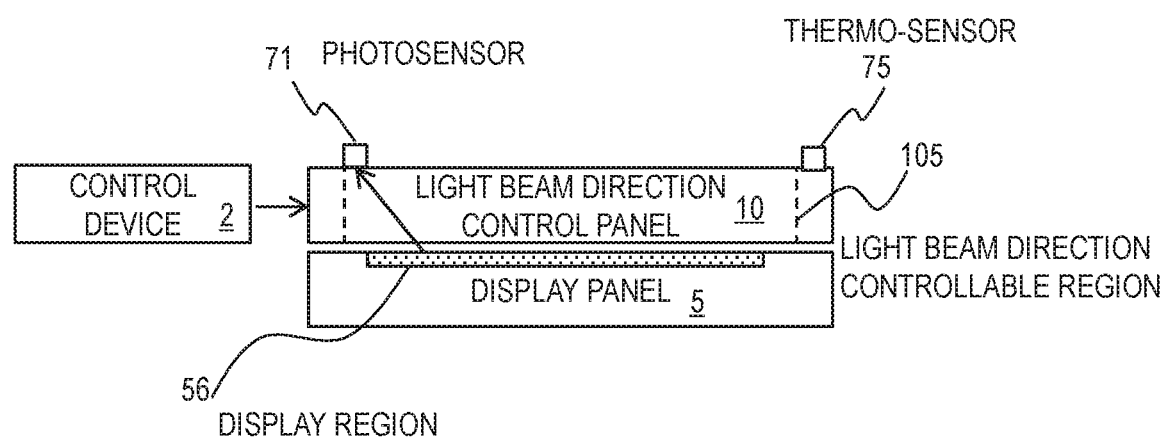
FIG. 18 illustrates a configuration example of a display device including a thermo-sensor for measuring temperature.

Hereinafter, temperature-based feedback control of the voltage to be applied is described. FIG. 18 illustrates a configuration example of a display device including a thermo-sensor 75 for measuring temperature. Hereinafter, differences from the configuration illustrated in FIG. 15 are mainly described. The thermo-sensor 75 is disposed on the front face of the light beam direction control panel 10 to measure the environmental temperature through the light beam direction control panel 10.

In the example illustrated in FIG. 18, the thermo-sensor 75 is disposed outside the display region 56 and the light beam direction controllable region 105 when viewed planarly. This disposition prevents the thermo-sensor 75 from becoming an obstacle for the displayed image. The thermo-sensor 75 can be disposed within the light beam direction controllable region 105. The thermo-sensor 75 is disposed at a desired place to measure the environmental temperature. Typically, the thermo-sensor 75 is disposed in the proximity of the light beam direction controllable region 105.

Figure 19:
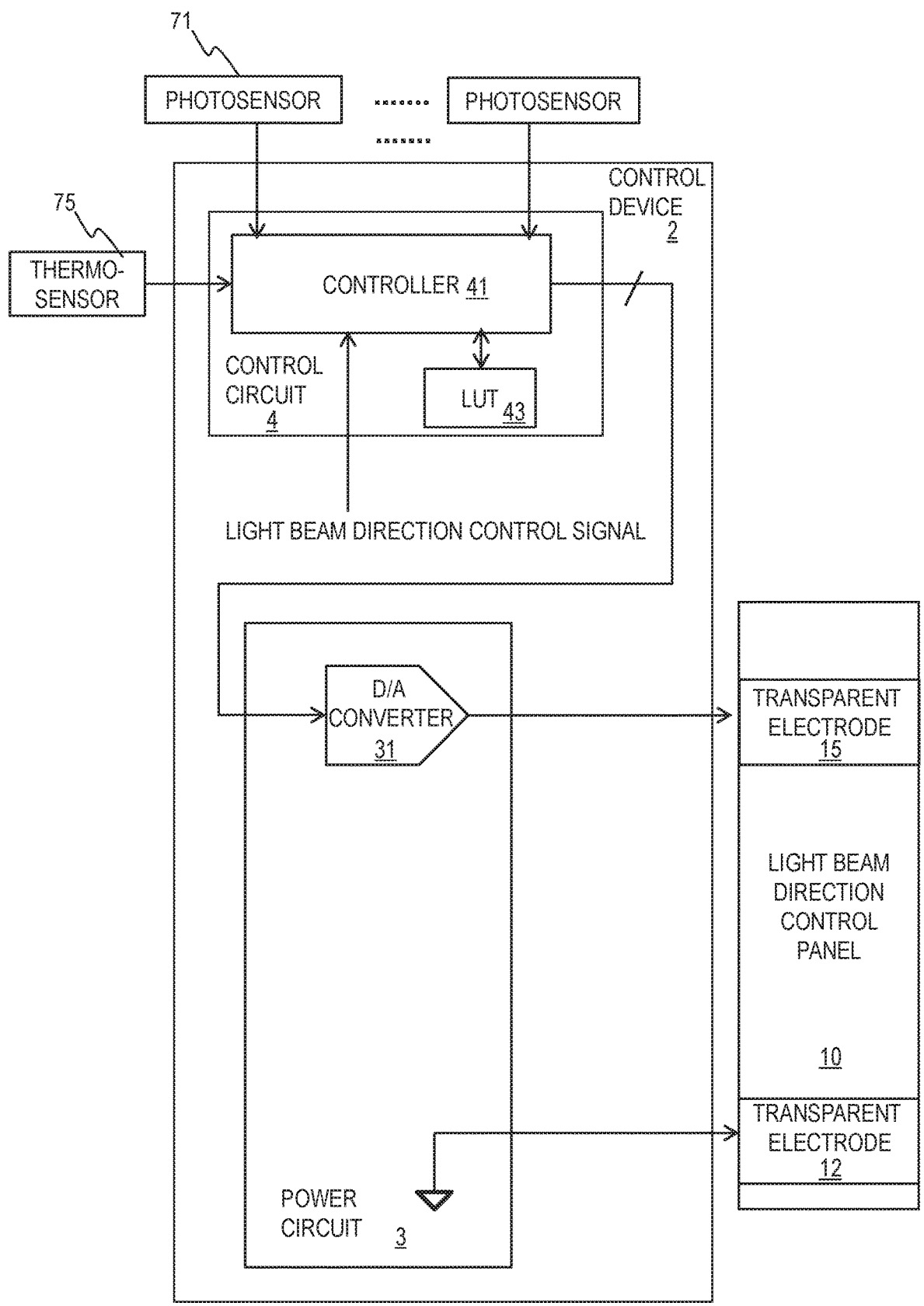
FIG. 19 schematically illustrates another example of the circuit configuration of the light beam direction control device.

FIG. 19 schematically illustrates another example of the circuit configuration of the light beam direction control device 1. Hereinafter, differences from the configuration illustrated in FIG. 17 are mainly described. The light beam direction control device 1 includes a thermo-sensor 75. Although the light beam direction control device 1 includes one thermo-sensor 75, the light beam direction control device 1 can include multiple thermo-sensors. In that case, the controller 41 can be configured to use the average of the temperatures measured by the plurality of thermo-sensors.

The thermo-sensor 75 measures the temperature around the thermo-sensor 75. The controller 41 determines a potential to be given to the transparent electrode 15 based on the information in the look-up table 43 and the values measured by the photosensors 71 and the thermo-sensor 75, and inputs data indicating the determined potential to the DA converter 31.

As described above, the responding speed of the light beam direction control panel 10 to the applied voltage slows down when the temperature falls. The controller 41 provides a higher voltage to the light beam direction control panel 10 when the temperature measured by the thermo-sensor 75 is lower. For example, the look-up table 43 includes information to determine the potential to be provided to the transparent electrode 15 from the measurement values of the photosensors 71 in each of a plurality of temperature ranges.

The controller 41 determines a temperature range including the temperature measured by the thermo-sensor 75 and consults the look-up table 43 with the temperature range. In application to the examples described with reference to FIGS. 11A and 13, the increment to the voltage at the time T1A and T1B is larger for a lower temperature range.

In application to the example described with reference to FIG. 11A, the look-up table 43 can be configured to indicate the voltage to be applied at the time T0 and the voltage to be applied (or the increment to the applied voltage) at the time T1A if the luminance of the transmitted light has not reached the target value, for each temperature range. In the case where the controller 41 controls the applied voltage at the time T1A depending on the measured luminance of the transmitted light, the look-up table 43 includes information for determining an increment to the applied voltage to meet the measured luminance of the transmitted light, such as information for relating the transmittance to the increment to the applied voltage, in each temperature range.

In application to the example described with reference to FIG. 13, the look-up table 43 can be configured to indicate the voltage to be applied at the time T0, the voltage to be applied (or the increment for the voltage) at the time T1A in the case where the luminance of the transmitted light has not reached the target value, and the voltage to be applied (or the increment for the voltage) at the time T1B in the case where the luminance of the transmitted light has not reached the target value, for each temperature range. In the case where the controller 41 controls the applied voltage at the time T1A depending on the measured luminance of the transmitted light, the look-up table 43 includes information for determining an increment to the applied voltage to meet the measured luminance of the transmitted light in each temperature range.

In application to the example described with reference to FIGS. 12 and 14, the increment for the amplitude of the alternating voltage is larger for a lower temperature range. In application to the example described with reference to FIG. 12, the look-up table 43 can be configured to indicate the amplitude of the alternating voltage to be applied (or the variation from the voltage applied at the time T0) at the time T1A if the luminance of the transmitted light has not reached the target value, for each temperature range. In the case where the controller 41 controls the amplitude depending on the measured luminance of the transmitted light, the look-up table 43 includes information for determining an amplitude to meet the measured luminance of the transmitted light, such as information for relating the transmittance to the amplitude, in each temperature range.

In application to the example described with reference to FIG. 14, the look-up table 43 can be configured to indicate the amplitude of the alternating voltage to be applied at the time T1A if the luminance of the transmitted light has not reached the target value and the amplitude of the alternating voltage to be applied at the time T1B if the luminance of the transmitted light has not reached the target value, for each temperature range. In the case where the controller 41 controls the amplitude depending on the measured luminance of the transmitted light, the look-up table 43 provides information for determining an amplitude to meet the measured luminance of the transmitted light at the times T1A and T1B, in each temperature range.

As described above, controlling the light beam direction control panel based on the measured value of the thermo-sensor in addition to the measured values of the photosensors enables the light beam direction control panel to change more speedily from a narrow viewing angle state to a wide viewing angle state.

Embodiment 3

Segmented Electrodes

Figure 20:
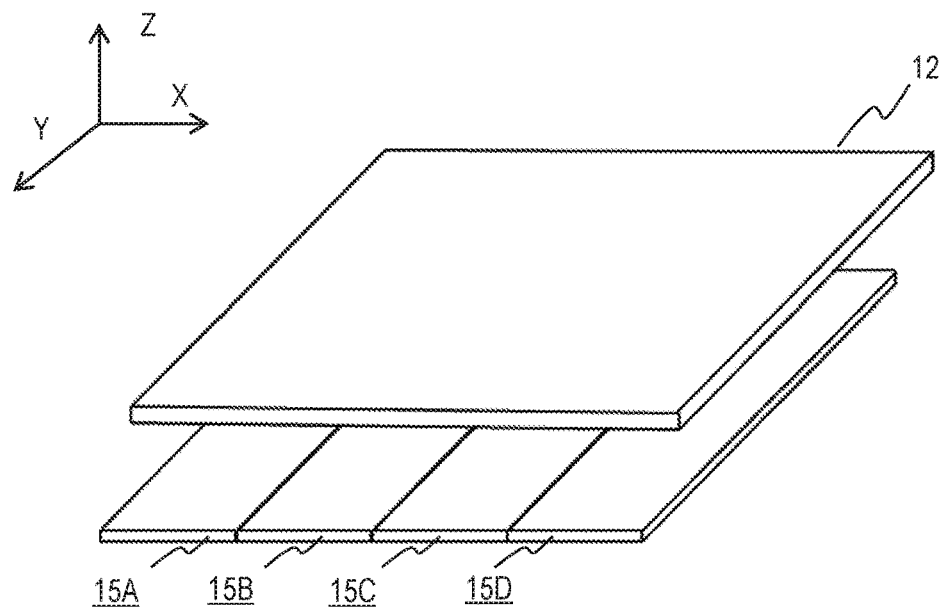
FIG. 20 is a perspective diagram of a configuration example of opposed electrodes of a light beam direction control panel.

Hereinafter, a configuration example of a light beam direction control device including a plurality of individually controllable transparent segmented electrodes on a transparent substrate is described. FIG. 20 is a perspective diagram of a configuration example of opposed electrodes of a light beam direction control panel 10. A sheet of transparent electrode 12 is opposed to a plurality of transparent segmented electrodes (a plurality of first transparent electrodes) 15A to 15D. The transparent electrode 12 is disposed on a transparent substrate 11 and the transparent segmented electrodes 15A to 15D are disposed on a transparent substrate 16. The part composed of a transparent segmented electrode, the part of the transparent electrode 12 opposed to the transparent segmented electrode, and the region sandwiched therebetween is called a segment. A segment consists of a transparent electrode pair consisting of transparent electrodes opposed to each other and the region sandwiched therebetween. The part of the transparent electrode 12 can be regarded as one transparent electrode.

In FIG. 20, the X-axis and the Y-axis are parallel to the main faces of the transparent substrates 11 and 16 and orthogonal to each other. The Z-axis is along the normal to the main faces of the transparent substrates 11 and 16 and orthogonal to the X-axis and the Y-axis.

Each of the transparent segmented electrodes 15A to 15D is shaped like a strip extending along the Y-axis. The transparent segmented electrodes 15A to 15D are separate and disposed side by side along the X-axis. The transparent segmented electrodes 15A to 15D are opposed to the transparent electrode 12. A plurality of light transmissive regions 13 and light absorbing regions 14 are provided between a transparent segmented electrode and the transparent electrode 12.

The control device 2 can provide potentials to the transparent segmented electrodes 15A to 15D individually. Each of the transparent segmented electrodes 15A to 15D is connected with the power circuit 3 through a different line.

Figure 21:
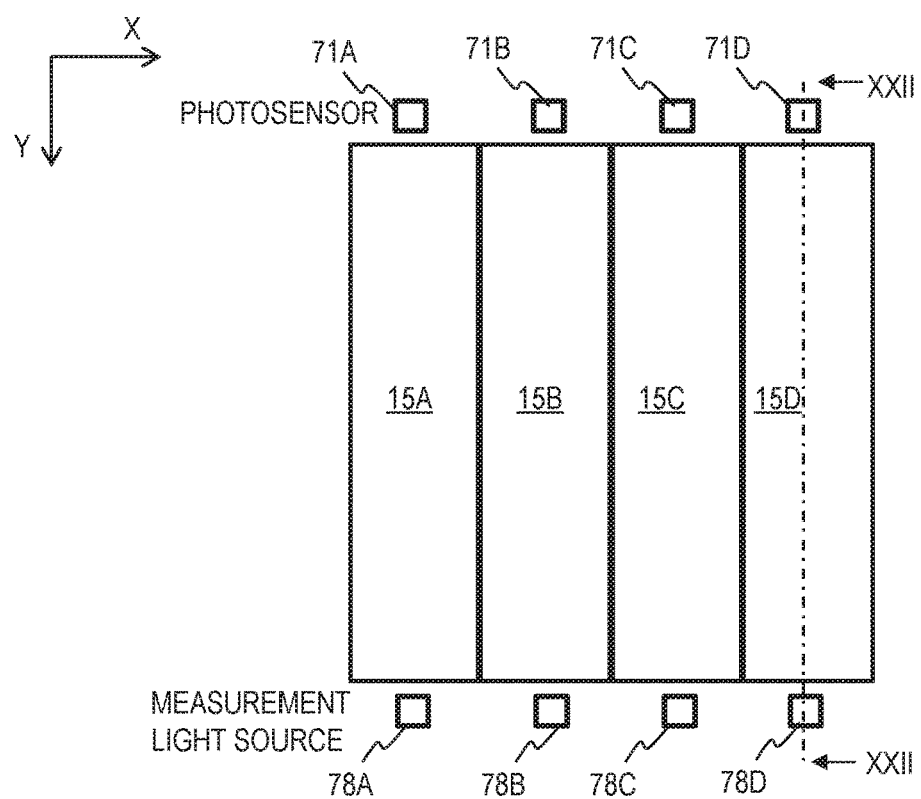
FIG. 21 is a plan diagram illustrating an example of the disposition of photosensors for measuring transmitted light from the light beam direction control panel and light sources for the measurement.

FIG. 21 is a plan diagram illustrating an example of the disposition of photosensors for measuring transmitted light from the light beam direction control panel 10 and light sources for the measurement. The light beam direction control device 1 includes a plurality of photosensors 71A to 71D and a plurality of measurement light sources 78A to 78D. The plurality of photosensors 71A to 71D are disposed along the X-axis. The plurality of measurement light sources 78A to 78D are disposed along the X-axis.

The photosensor 71A and the measurement light source 78A are opposed to each other along the Y-axis and sandwich the transparent segmented electrode 15A when viewed planarly. The photosensor 71A and the measurement light source 78A are to measure the light transmitted through between the transparent segmented electrode 15A and the transparent electrode 12. The photosensor 71B and the measurement light source 78B are opposed to each other along the Y-axis and sandwich the transparent segmented electrode 15B when viewed planarly. The photosensor 71B and the measurement light source 78B are to measure the light transmitted through between the transparent segmented electrode 15B and the transparent electrode 12.

The photosensor 71C and the measurement light source 78C are opposed to each other along the Y-axis and sandwich the transparent segmented electrode 15C when viewed planarly. The photosensor 71C and the measurement light source 78C are to measure the light transmitted through between the transparent segmented electrode 15C and the transparent electrode 12. The photosensor 71D and the measurement light source 78D are opposed to each other along the Y-axis and sandwich the transparent segmented electrode 15D when viewed planarly. The photosensor 71D and the measurement light source 78D are to measure the light transmitted through between the transparent segmented electrode 15D and the transparent electrode 12.

Figure 22A:
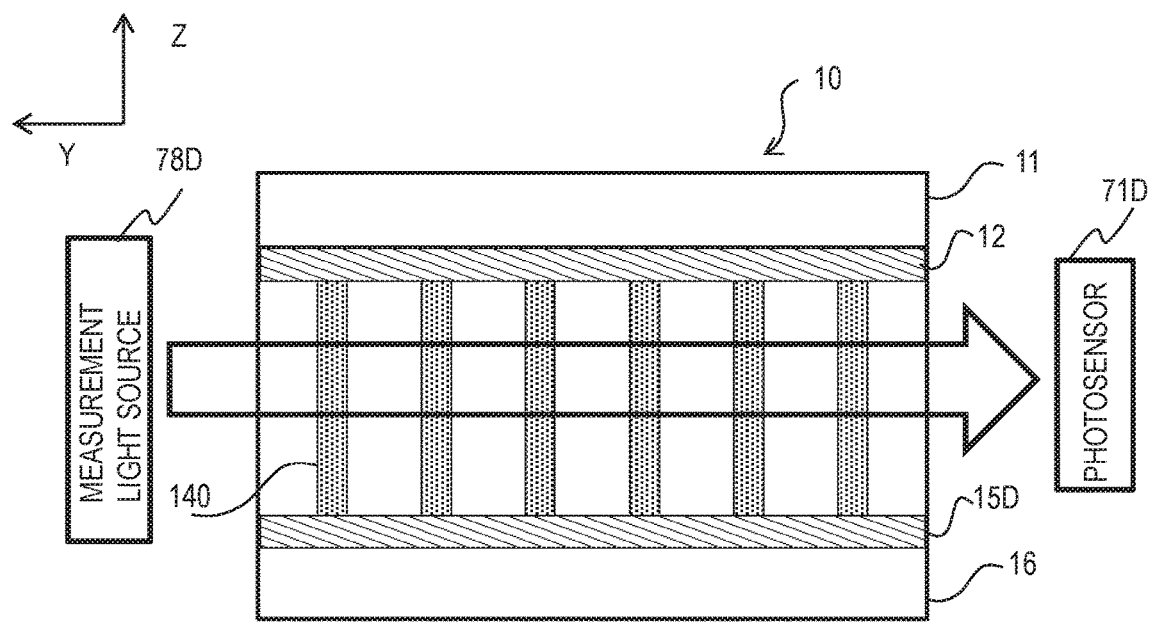
FIG. 22A is a cross-sectional diagram of FIG. 21 cut along the line XXII-XXII when the light beam direction control panel is in a narrow viewing angle state.
Figure 22B:
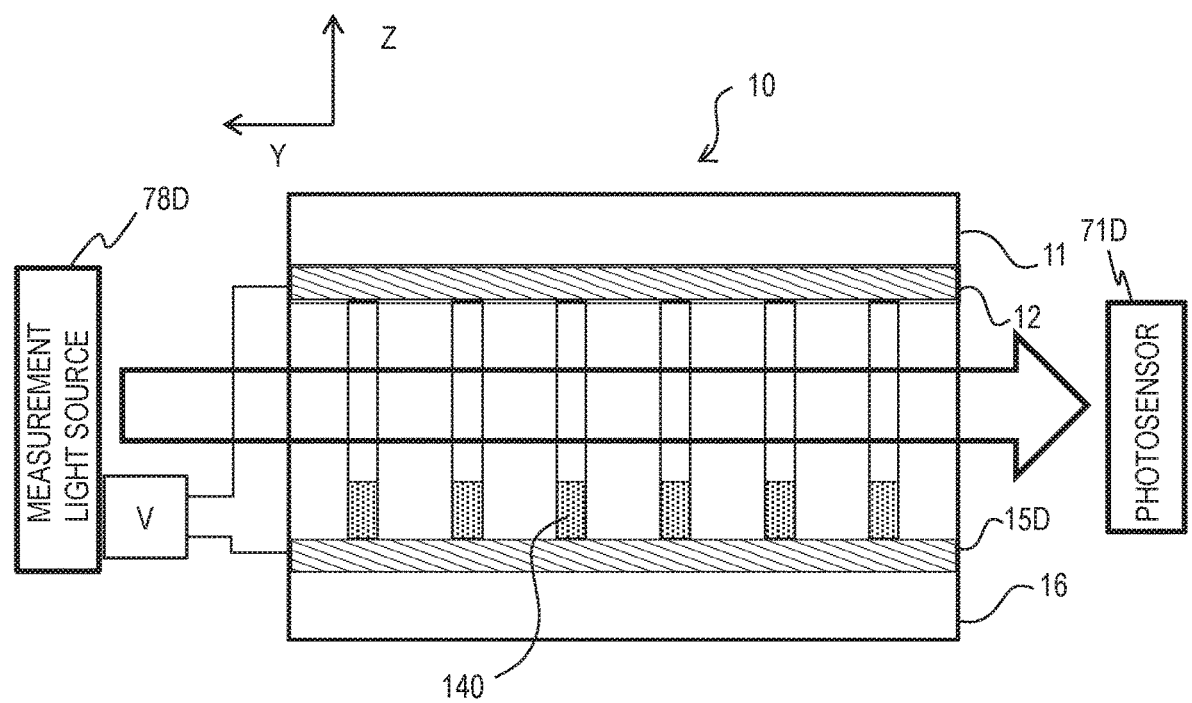
FIG. 22B is a cross-sectional diagram of FIG. 21 cut along the line XXII-XXII when the light beam direction control panel is in a wide viewing angle state.

FIGS. 22A and 22B are cross-sectional diagram of FIG. 21 cut along the line XXII-XXII. FIG. 22A is a diagram in a narrow viewing angle state and FIG. 22B is a diagram in a wide viewing angle state. The light receiving face of the photosensor 71D is opposed to the light emission face of the measurement light source 78D and they are located between the transparent segmented electrode 15D and the transparent electrode 12 along the Z-axis.

The photosensor 71D measures the light transmitted along the Y-axis between the transparent segmented electrode 15D and the transparent electrode 12 out of the light from the measurement light source 78D. The light to be measured travels along the main faces of the transparent substrates 11 and 16 and is measured. The luminance of the transmitted light is different depending on the distribution of electrophoretic particles 140 between the transparent segmented electrode 15D and the transparent electrode 12. The control device 2 can determine the transmittance between the transparent segmented electrode 15D and the transparent electrode 12 from the value measured by the photosensor 71D.

The same explanation is applicable to the pair of the photosensor 71A and the measurement light source 78A, the pair of the photosensor 71B and the measurement light source 78B, and the pair of the photosensor 71C and the measurement light source 78C. The control device 2 determines the transmittance between the transparent segmented electrode 15A and the transparent electrode 12, the transmittance between the transparent segmented electrode 15B and the transparent electrode 12, and the transmittance between the transparent segmented electrode 15C and the transparent electrode 12 from the values measured from these pairs.

The control device 2 individually controls the potentials to be provided to the transparent segmented electrodes 15A to 15D based on the measurement values of the photosensors 71A to 71D. Hence, the segments of the light beam direction control panel 10 can be controlled individually. The ways of control described with reference to FIGS. 11A to 14 are applicable to the control of each segment; control information is prepared for each segment.

The measurement light sources 78A to 78D can be LEDs that output infrared or ultraviolet light, for example. Using light outer than the visible light range enables the user not to see the light from the measurement light sources 78A to 78D. This is applicable to any embodiment using a measurement light source.

The control device 2 can modulate the output of the measurement light sources 78A to 78D. For example, the control device 2 controls the measurement light sources 78A to 78D to output pulsed light at a predetermined frequency. The control device 2 filters the light receiving signals from the photosensors 71A to 71D to extract light receiving signals corresponding to the light from the measurement light sources 78A to 78D. This configuration reduces the effects of the environmental light to measure the light from the measurement light sources 78A to 78D more accurately. In this connection, LEDs that output visible light can be employed as the measurement light sources 78A to 78D if they are configured to output pulsed light having shorter emission time in addition to the modulation of their output.

Figure 23:
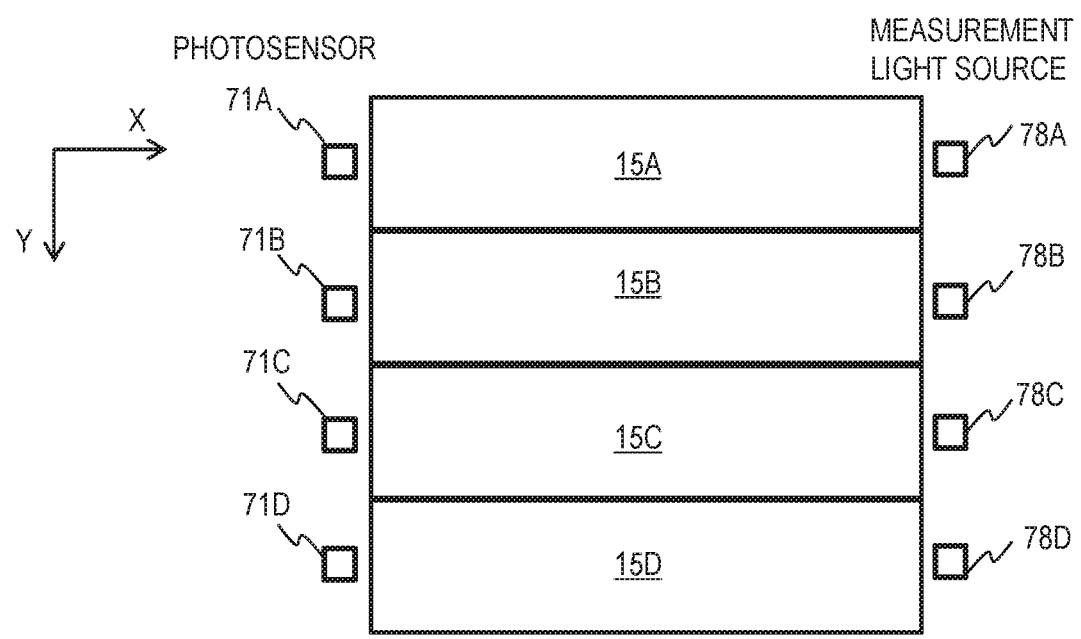
FIG. 23 is a plan diagram illustrating another example of the disposition of transparent segmented electrodes, photosensors, and measurement light sources of a light beam direction control panel.

FIG. 23 is a plan diagram illustrating another example of the disposition of transparent segmented electrodes, photosensors, and measurement light sources of a light beam direction control panel 10. Differences from FIG. 21 are mainly described. In the configuration example of FIG. 23, each of the transparent segmented electrodes 15A to 15D is shaped like a strip extending along the X-axis. The transparent segmented electrodes 15A to 15D are separate and disposed one above another along the Y-axis.

The control device 2 can provide potentials to the transparent segmented electrodes 15A to 15D individually. Each of the transparent segmented electrodes 15A to 15D is connected with the power circuit 3 through a different line.

The plurality of photosensors 71A to 71D are disposed along the Y-axis. The plurality of measurement light sources 78A to 78D are disposed along the Y-axis. The photosensor 71A and the measurement light source 78A are opposed to each other along the X-axis and sandwich the transparent segmented electrode 15A when viewed planarly. The photosensor 71A and the measurement light source 78A are to measure the light transmitted through between the transparent segmented electrode 15A and the transparent electrode 12. The photosensor 71B and the measurement light source 78B are opposed to each other along the X-axis and sandwich the transparent segmented electrode 15B when viewed planarly. The photosensor 71B and the measurement light source 78B are to measure the light transmitted through between the transparent segmented electrode 15B and the transparent electrode 12.

The photosensor 71C and the measurement light source 78C are opposed to each other along the X-axis and sandwich the transparent segmented electrode 15C when viewed planarly. The photosensor 71C and the measurement light source 78C are to measure the light transmitted through between the transparent segmented electrode 15C and the transparent electrode 12. The photosensor 71D and the measurement light source 78D are opposed to each other along the X-axis and sandwich the transparent segmented electrode 15D when viewed planarly. The photosensor 71D and the measurement light source 78D are to measure the light transmitted through between the transparent segmented electrode 15D and the transparent electrode 12.

The shapes and the layout of the transparent segmented electrodes are not limited to the foregoing examples. The number of transparent segmented electrodes can be as desired. Each of the transparent segmented electrodes can have a different shape. The transmitted light from one segment can be measured with two or more pairs of photosensors and light sources. Multiple transparent segmented electrodes can be controlled in accordance with the measurement result of one pair of a photosensor and a measurement light source. The transparent substrates 11 and 16 can both have separate transparent segmented electrodes thereon. The minimum combination is one segment and one pair of a photosensor and a measurement light source. Explaining it with FIG. 21, a light beam direction control panel 10 including the transparent electrode 15A and a pair of the photosensor 71A and the measurement light source 78A can constitute a combination.

Figure 24:
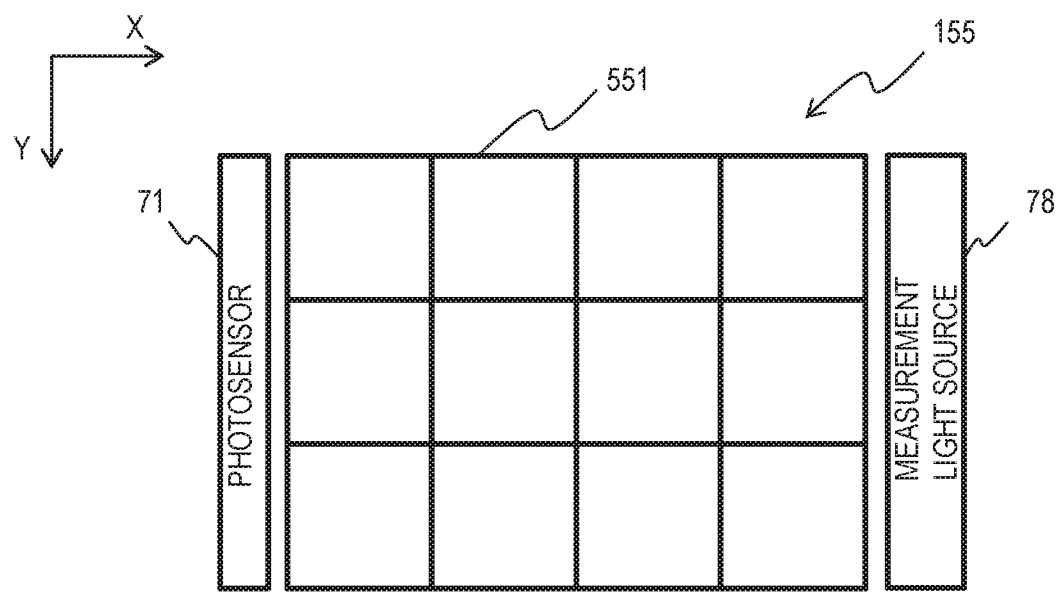
FIG. 24 illustrates still another example of transparent segmented electrodes of a light beam direction control panel.

FIG. 24 illustrates still another example of transparent segmented electrodes in a light beam direction control panel 10. A sheet of transparent electrode 12 (not shown in FIG. 24) is opposed to a transparent segmented electrode set 155 composed of a plurality of transparent segmented electrodes 551. The transparent electrode 12 is disposed on the transparent substrate 11 and the transparent segmented electrodes 551 are disposed on the transparent substrate 16.

In FIG. 24, only one of the transparent segmented electrodes is provided with a reference sign 551 by way of example. Instead of one sheet of transparent electrode 12, a plurality of transparent segmented electrodes can be disposed on the transparent substrate 11. Each transparent segmented electrode on the transparent substrate 11 is opposed to one of the transparent segmented electrodes 551 on the transparent substrate 16.

The transparent segmented electrodes 51 are disposed in a matrix. Specifically, four transparent segmented electrodes 551 are disposed along the X-axis and three transparent segmented electrodes 551 are disposed along the Y-axis. The transparent segmented electrodes 551 are separate and they are opposed to the transparent electrode 12. A plurality of light transmissive regions 13 and a plurality of light absorbing regions 14 are provided between a transparent segmented electrode 551 and the transparent electrode 12.

In the example of FIG. 24, one measurement light source 78 and one photosensor 71 are disposed to sandwich the transparent segmented electrode set 155 when viewed planarly. The photosensor 71 and the measurement light source 78 are opposed to each other along the X-axis. The photosensor 71 and the measurement light source 78 measure the light transmitted through between the transparent segmented electrode set 155 and the transparent electrode 12.

The control device 2 can use the average of the measurement results from a plurality of pairs of photosensors and measurement light sources. The photosensor 71 and the measurement light source 78 can be disposed at other locations. The photosensor 71 can be disposed on the front face of the light beam direction control panel 10 and the measurement light source 78 can be omitted as described with reference to FIG. 15 or 16.

Each transparent segmented electrode 551 is connected with the power circuit 3 through a different line. The control device 2 can provide potentials to the transparent segmented electrodes 551 individually. The control device 2 individually controls the potentials of the transparent segmented electrodes 551 in accordance with the measurement result of the photosensor 71.

The shapes and the layout of the transparent segmented electrodes 551 are not limited to the example illustrated in FIG. 24. The transparent segmented electrodes 551 can have a desired shape and/or different shapes. The transparent segmented electrodes 551 can be disposed in a layout different from a matrix.

Figure 25:
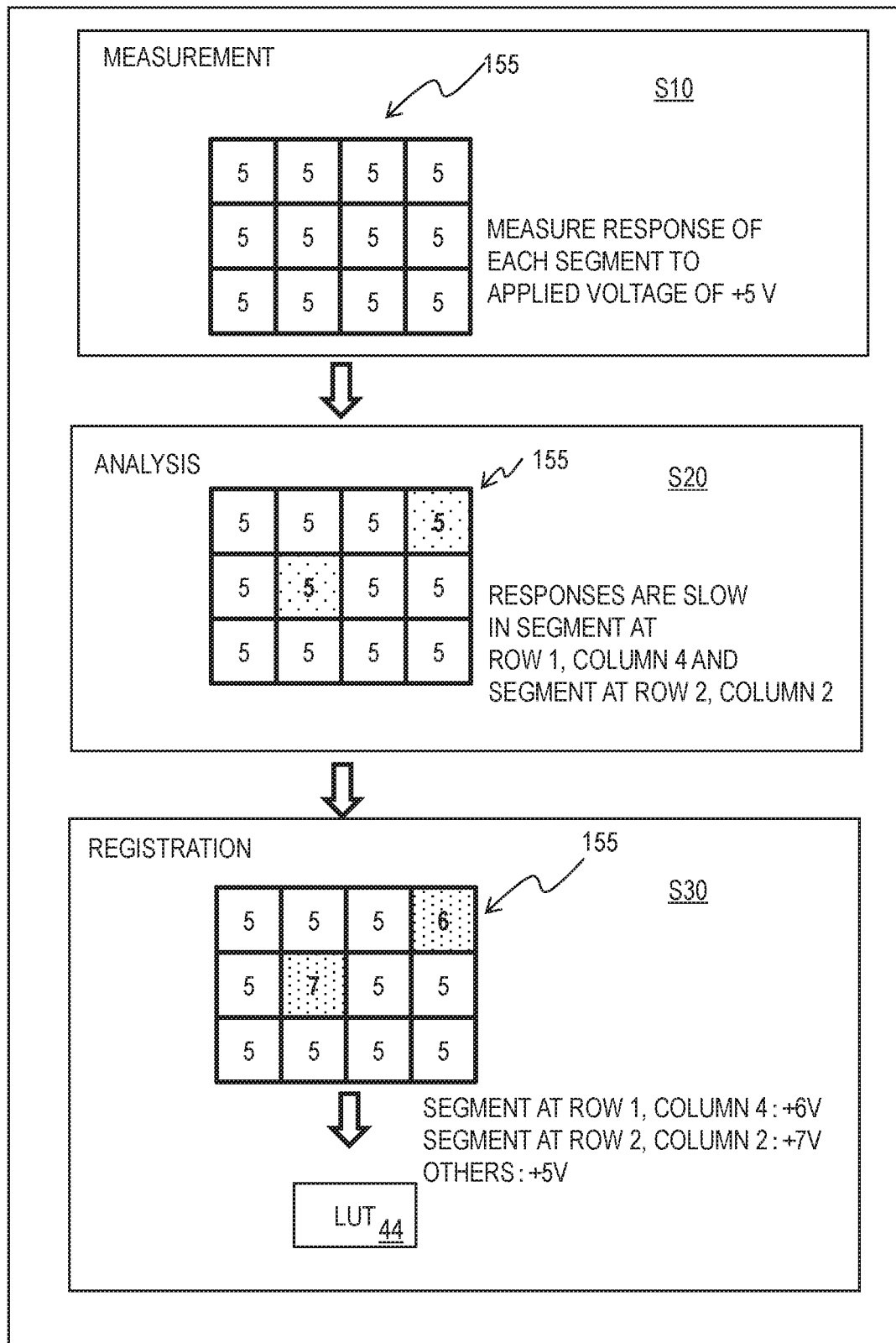
FIG. 25 schematically illustrates an example of a method of configuring the control of the voltages to be applied to individual transparent segmented electrodes.

FIG. 25 schematically illustrates an example of a method of configuring the control of the voltages to be applied to the individual transparent segmented electrodes 551. This configuration method registers information for individually controlling the voltages to be applied to the transparent segmented electrodes 551 to a look-up table 44. The registration to the look-up table 44 can be done by the control device 2 or in accordance with a signal from an external control device that is independent from the light beam direction control device 1.

This configuration method individually measures the transmittance responses of the segments (S10). Specifically, the method selects one segment (transparent segmented electrode 551) from the transparent segmented electrode set 155 and makes the selected segment to a narrow viewing angle state and the other segments to a wide viewing angle state. Specifically, the method provides the transparent segmented electrode 551 of the selected segment with 0 V and all the other transparent segmented electrodes 551 with a predetermined potential, for example 10 V. The transparent electrode 12 is maintained at the ground potential. As a result, all transparent segmented electrodes 551 except for the selected transparent segmented electrode 551 are maintained in a wide viewing angle state.

Subsequently, the method changes the selected segment from the narrow viewing angle state to a wide viewing angle state. Specifically, the method increases the voltage to be applied to the segmented electrode 551 of the selected segment from 0 V to a predetermined potential, for example +5 V. The method measures the transmitted light after the voltage is raised to +5 V. This configuration method selects the transparent segmented electrodes 551 one after another to measure the transmittance response of each segment.

Next, this configuration method analyzes the measurement results to determine the value for each segment (S20). Specifically, the method compares the luminance of the transmitted light from each segment with a threshold after a predetermined time has elapsed since the applied voltage is increased to +5 V and determines the voltage to be applied to each segment based on the difference. For example, in application to the example described with reference to FIG. 11A, the method determines the voltages to be applied at the times T0 and T1A; in application to the example described with reference to FIG. 12, the method determines the voltage to be applied at the time T0 and the amplitude of the alternating voltage.

Application to the example described with reference to FIG. 11A is described as follows. If the measured luminance of the transmitted light has reached a first threshold, the method determines that the voltage to be applied at the time T0 is +5 V and the increased voltage to be applied after the time T1A is +10 V. If the measured luminance of the transmitted light is lower than the first threshold and the difference from the first threshold is smaller than a second threshold, the method determines that the voltage to be applied at the time T0 is +6 V and the increased voltage to be applied after the time T1A is +11 V. If the measured luminance of the transmitted light is lower than the first threshold and the difference is larger than the second threshold, the method determines that the voltage to be applied at the time T0 is +7 V and the increased voltage to be applied after the time T1A is +12 V.

Application to the example described with reference to FIG. 12 is described as follows. If the measured luminance of the transmitted light has reached a first threshold, the method determines that the voltage to be applied at the time T0 and the amplitude of the alternating voltage are +5 V. If the measured luminance of the transmitted light is lower than the first threshold and the difference from the first threshold is smaller than a second threshold, the method determines that the voltage to be applied at the time T0 and the amplitude of the alternating voltage are +6 V. If the measured luminance of the transmitted light is lower than the first threshold and the difference is larger than the second threshold, the method determines that the voltage to be applied at the time T0 and the amplitude of the alternating voltage are +7 V.

In the example of FIG. 25, the responses of the segment in the first row and the fourth column and the segment in the second row and second column are slow. The segment in the first row and the fourth column is determined to be provided with +6 V and the segment in the second row and the second column is determined to be provided with +7 V. Lastly, the configuration method registers the determined configuration information to the look-up table 44 in the control device 2 (S30). The look-up table 44 stores configuration information for each segment.

Figure 26:
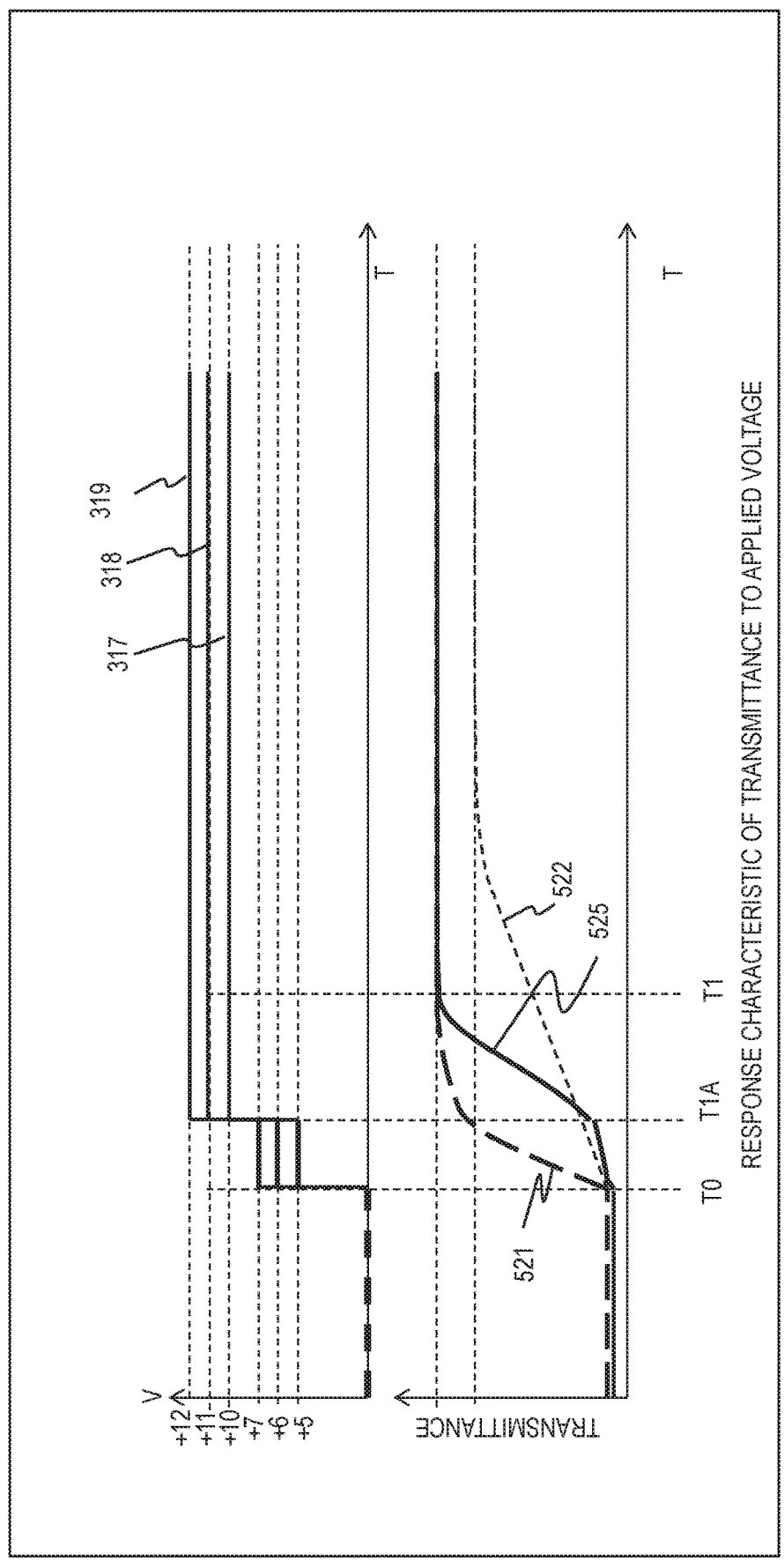
FIG. 26 illustrates an example of the feedback control of the voltages to be applied in accordance with the look-up table configured by the method illustrated in FIG. 25.

FIG. 26 illustrates an example of the feedback control of the voltages to be applied in accordance with the look-up table 44 configured by the method illustrated in FIG. 25. Differences from the example described with reference to FIG. 11A are mainly described.

The solid lines 317, 318, and 319 in the graph of applied voltage represent the applied voltages feedback-controlled by the control device 2. The applied voltage 318 is for the segment in the first row and the fourth column in the example of FIG. 25; the applied voltage 319 is for the segment in the second row and the second column in the example of FIG. 25; and the applied voltage 317 is for the other segments in the example of FIG. 25.

The control device 2 applies +6 V to the segment in the first row and the fourth column, +7 V to the segment in the second row and the second column, and +5 V to the other segments at a time T0 to change the viewing angle from a narrow viewing angle state to a wide viewing angle state. The control device 2 measures the luminance of the transmitted light from the light beam direction control panel 10 at a time T1A. If the luminance of the transmitted light from the light beam direction control panel 10 has reached the target value at the time T1A, the control device 2 maintains the voltage applied to each segment.

In the example of FIG. 26, the measured luminance of the transmitted light is lower than the target value. The control device 2 increases the voltages to be applied to the segments. The control device 2 applies +11 V to the segment in the first row and the fourth column, +12 V to the segment in the second row and the second column, and +10 V to the other segments.

The transmittance response characteristics can be equalized among individual segments by predetermining the voltages to be applied in accordance with the measurement results of the transmittance response characteristic of the segments as described above.

Figure 27:
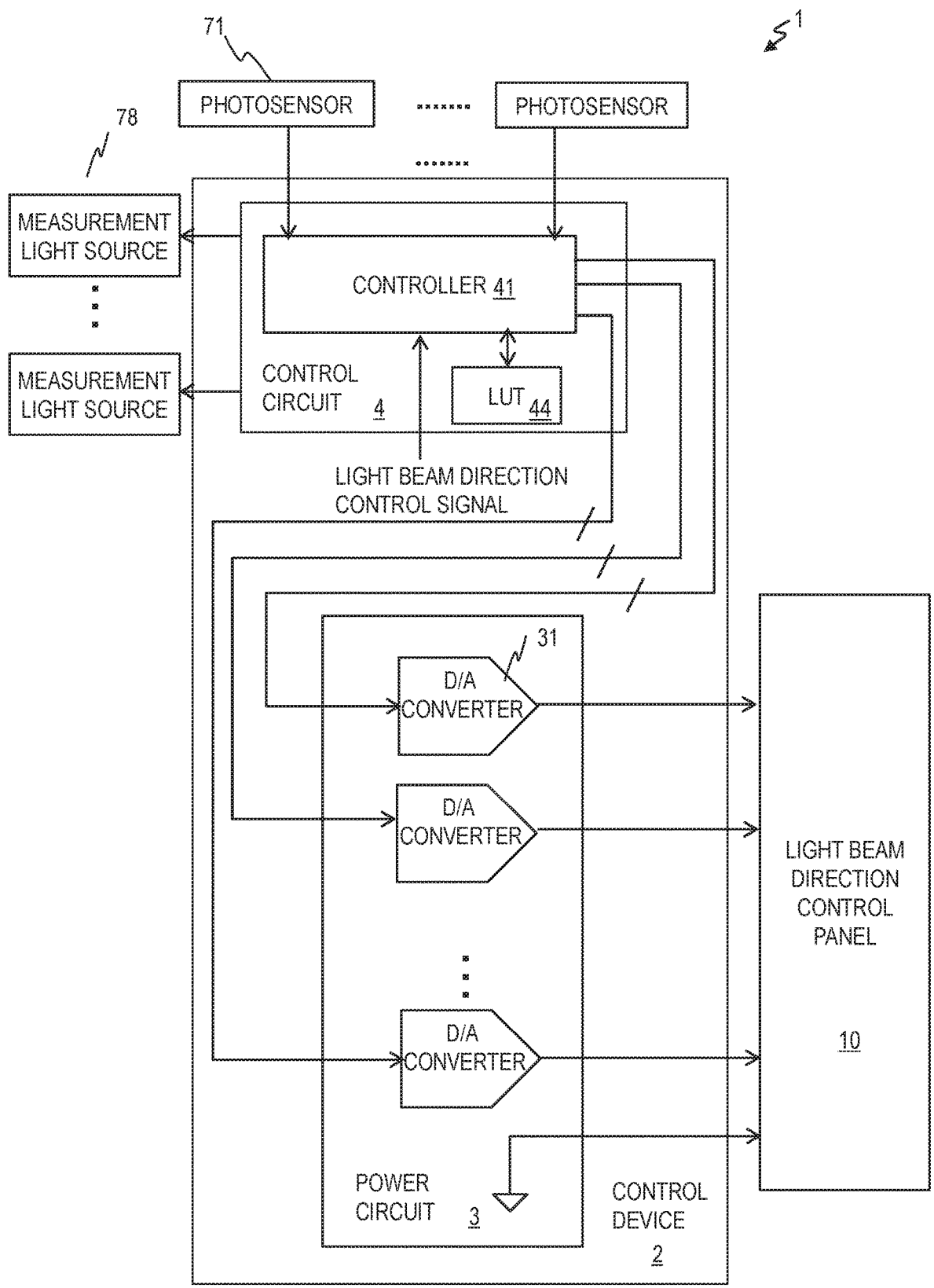
FIG. 27 schematically illustrates an example of the circuit configuration of a light beam direction control device.

FIG. 27 schematically illustrates an example of the circuit configuration of the light beam direction control device 1. Differences from the example illustrated in FIG. 17 are mainly described. The light beam direction control device 1 includes a configuration for individually controlling the plurality of segments. The light beam direction control device 1 includes a plurality of measurement light sources 78 each paired with a photosensor 71. In FIG. 27, only one of the measurement light sources is provided with a reference sign 78. The controller 41 controls the measurement light sources 78.

For example, in the example described with reference to FIGS. 20 to 23, each pair of a photosensor 71 and a measurement light source 78 measures transmitted light from a segment. In the example described with reference to FIGS. 24, 25, and 26, the average value of the values measured by the pairs of a photosensor 71 and a measurement light source 78 is used to control the voltages to be applied. The number of photosensors 71 and the number of measurement light sources 78 can be one.

The control circuit 4 includes a look-up table (LUT) 44. The look-up table 44 stores configuration information for each segment. The power circuit 3 includes a plurality of DA converters 31. In FIG. 27, only one of the DA converters is provided with a reference sign 31. The outputs of the DA converters 31 are provided to the associated transparent segmented electrodes. The power circuit 3 provides the transparent electrode 12 with the ground potential as reference potential.

The controller 41 controls the outputs of the DA converters 31 in accordance with the consultation results of the look-up table 44 with the values measured by the photosensors 71 to control the voltages to be applied to individual segments (transparent segmented electrodes). The specific control method has been described with reference to FIGS. 20 to 26. The power circuit 3 can include a voltage-dividing circuit for applying multiple potentials and selectors for selecting one of the potentials, in place of the DA converters 31.

As set forth above, embodiments of this disclosure have been described; however, this disclosure is not limited to the foregoing configuration examples. Those skilled in the art can easily modify, add, or convert each element in the foregoing configuration examples within the scope of this disclosure. A part of one configuration example can be replaced with a part of another configuration example or a part of a configuration example can be incorporated into another configuration example.

What is claimed is:

1. A light beam direction control device comprising:
   a light beam direction control panel; and
   a control circuit configured to control the light beam direction control panel, wherein the light beam direction control panel includes:
a first transparent substrate having a first main face;
a second transparent substrate having a second main face opposed to the first main face,
a plurality of light transmissive regions provided between the first main face and the second main face, the plurality of light transmissive regions being arrayed along the first main face;
a plurality of light absorbing regions provided between the first main face and the second main face, each of the plurality of light absorbing regions including light-absorptive electrophoretic particles having charges of a specific polarity and light-transmissive dispersion medium and being disposed between light transmissive regions adjacent to each other; and
a first transparent electrode and a second transparent electrode provided on the first main face of the first transparent substrate and the second main face of the second transparent substrate, respectively, in such a manner that the first transparent electrode and the second transparent electrode sandwich the plurality of light absorbing regions, and
wherein the control circuit is configured to:
change a dispersion state of the electrophoretic particles by controlling voltage across the first transparent electrode and the second transparent electrode to change a range of exit direction of light transmitted through the light transmissive regions and the dispersion medium;
apply direct voltage at a first voltage value across the first transparent electrode and the second transparent electrode to change the range of exit direction from a narrow range to a wide range;
measure luminance of light transmitted through the light beam direction control panel during application of the voltage at the first voltage value; and
increase the voltage value to be applied across the first transparent electrode and the second transparent electrode in a case where the measured luminance of the transmitted light is lower than a target value.

2. The light beam direction control device according to claim 1, wherein the control circuit is configured to determine a voltage value to be added to the first voltage value based on a difference of the measured luminance and the target value.

3. The light beam direction control device according to claim 1, wherein the control circuit is configured to:
increase the voltage value to be applied across the first transparent electrode and the second transparent electrode from the first voltage value to a second voltage value in a case where the measured luminance is lower than the target value;
measure luminance of light transmitted through the light beam direction control panel during application of the voltage at the second voltage value; and
increase the voltage value to be applied across the first transparent electrode and the second transparent electrode from the second voltage value in a case where the luminance of the transmitted light measured during application of the voltage at the second voltage value is lower than the target value.

4. The light beam direction control device according to claim 1, wherein the control circuit is configured to:
measure temperature; and
determine a voltage value to be added to the first voltage value based on the measured temperature.

5. The light beam direction control device according to claim 1, further comprising a light source for measurement,
wherein the control circuit is configured to measure luminance of light emitted from the light source for measurement and transmitted through the light beam direction control panel.

6. The light beam direction control device according to claim 5, wherein the light emitted from the light source for measurement travels along the first main face and the second main face before being measured.

7. The light beam direction control device according to claim 5, wherein the control circuit is configured to modulate output of the light source for measurement.

8. The light beam direction control device according to claim 1,
wherein the light beam direction control device comprises:
a plurality of separate first transparent electrodes on the first main face; and
one or more second transparent electrodes on the second main face, the one or more second transparent electrodes being opposed to the plurality of first transparent electrodes,
wherein a plurality of transparent electrode pairs are configured with the plurality of first transparent electrodes and the one or more second transparent electrodes and each transparent electrode pair consists of one first transparent electrode and one second transparent electrode, and
wherein the control circuit is configured to:
apply direct voltage at a predetermined voltage value across each of the plurality of transparent electrode pairs to change the range of exit direction from a narrow range to a wide range;
measure luminance of light transmitted through each region sandwiched by one of the plurality of transparent electrode pairs during application of the direct voltage at the predetermined voltage value; and
increase the voltage value to be applied across the transparent electrode pair of a region where the measured luminance is lower than the target value.

9. The light beam direction control device according to claim 1,
wherein the light beam direction control device comprises:
a plurality of separate first transparent electrodes on the first main face; and
one or more second transparent electrodes on the second main face, the one or more second transparent electrodes being opposed to the plurality of first transparent electrodes,
wherein a plurality of transparent electrode pairs are configured with the plurality of first transparent electrodes and the one or more second transparent electrodes and each transparent electrode pair consists of one first transparent electrode and one second transparent electrode, and
wherein the control circuit is configured to:
apply direct voltage at a predetermined voltage value across each of the plurality of transparent electrode pairs to change the range of exit direction from a narrow range to a wide range;
measure luminance of light transmitted through each region sandwiched by one of the plurality of transparent electrode pairs during application of the direct voltage at the predetermined voltage value;

determine voltage values to be added to the predetermined voltage value of the direct voltage individually for the plurality of transparent electrode pairs based on predetermined information in a case where the measured luminance is lower than the target value; and increase the direct voltage for the plurality of transparent electrode pairs by the determined voltage values individually.

10. A light beam direction control device comprising:
a light beam direction control panel; and
a control circuit configured to control the light beam direction control panel,
wherein the light beam direction control panel includes:
a first transparent substrate having a first main face;
a second transparent substrate having a second main face opposed to the first main face;
a plurality of light transmissive regions provided between the first main face and the second main face, the plurality of light transmissive regions being arrayed along the first main face;
a plurality of light absorbing regions provided between the first main face and the second main face, each of the plurality of light absorbing regions including light-absorptive electrophoretic particles having charges of a specific polarity and light-transmissive dispersion medium and being disposed between light transmissive regions adjacent to each other; and
a first transparent electrode and a second transparent electrode provided on the first main face of the first transparent substrate and the second main face of the second transparent substrate, respectively, in such a manner that the first transparent electrode and the second transparent electrode sandwich the plurality of light absorbing regions, and
wherein the control circuit is configured to:
change a dispersion state of the electrophoretic particles by controlling voltage across the first transparent electrode and the second transparent electrode to change a range of exit direction of light transmitted through the light transmissive regions and the dispersion medium;
apply direct voltage across the first transparent electrode and the second transparent electrode to change the range of exit direction from a narrow range to a wide range;
measure luminance of light transmitted through the light beam direction control panel during application of the direct voltage; and
apply alternating voltage across the first transparent electrode and the second transparent electrode in a case where the measured luminance of the transmitted light is lower than a target value.

11. The light beam direction control device according to claim 10, wherein the control circuit is configured to determine an amplitude of the alternating voltage based on a difference of the measured luminance and the target value.

12. The light beam direction control device according to claim 10, wherein the control circuit is configured to:
measure luminance of light transmitted through the light beam direction control panel during application of the alternating voltage; and
increase amplitude of the alternating voltage in a case where the luminance of the transmitted light measured during application of the alternating voltage is lower than the target value.

13. The light beam direction control device according to claim 10, wherein the control circuit is configured to:
measure temperature; and
determine an amplitude of the alternating voltage based on the measured temperature.

14. The light beam direction control device according to claim 10, further comprising a light source for measurement,
wherein the control circuit is configured to measure luminance of light emitted from the light source for measurement and transmitted through the light beam direction control panel.

15. The light beam direction control device according to claim 14, wherein the light emitted from the light source for measurement travels along the first main face and the second main face before being measured.

16. The light beam direction control device according to claim 14, wherein the control circuit is configured to modulate output of the light source for measurement.

17. The light beam direction control device according to claim 10,
wherein the light beam direction control device comprises:
a plurality of separate first transparent electrodes on the first main face; and
one or more second transparent electrodes on the second main face, the one or more second transparent electrodes being opposed to the plurality of first transparent electrodes,
wherein a plurality of transparent electrode pairs are configured with the plurality of first transparent electrodes and the one or more second transparent electrodes and each transparent electrode pair consists of one first transparent electrode and one second transparent electrode, and
wherein the control circuit is configured to:
apply direct voltage at a predetermined voltage value across each of the plurality of transparent electrode pairs to change the range of exit direction from a narrow range to a wide range;
measure luminance of light transmitted through each region sandwiched by one of the plurality of transparent electrode pairs during application of the direct voltage at the predetermined voltage value; and
change the voltage to be applied across the transparent electrode pair of a region where the measured luminance is lower than the target value to alternating voltage.

18. The light beam direction control device according to claim 10,
wherein the light beam direction control device comprises:
a plurality of separate first transparent electrodes on the first main face; and
one or more second transparent electrodes on the second main face, the one or more second transparent electrodes being opposed to the plurality of first transparent electrodes,
wherein a plurality of transparent electrode pairs are configured with the plurality of first transparent electrodes and the one or more second transparent electrodes and each transparent electrode pair consists of one first transparent electrode and one second transparent electrode, and
wherein the control circuit is configured to:
apply direct voltage at a predetermined voltage value across each of the plurality of transparent electrode pairs to change the range of exit direction from a narrow range to a wide range;

measure luminance of light transmitted through each region sandwiched by one of the plurality of transparent electrode pairs during application of the direct voltage at the predetermined voltage value;

determine amplitudes of the alternating voltage individually for the plurality of transparent electrode pairs based on predetermined information in a case where the measured luminance is lower than the target value; and change the direct voltage for the plurality of transparent electrode pairs to alternating voltage having the determined amplitudes individually.

* * * * *